United States Patent
Bhatt et al.

(10) Patent No.: US 8,185,822 B2
(45) Date of Patent: May 22, 2012

(54) IMAGE APPLICATION PERFORMANCE OPTIMIZATION

(75) Inventors: Nikhil Bhatt, Cupertino, CA (US); Alex Wallace, Sunnyvale, CA (US); Curt Bianchi, Saratoga, CA (US); Mark Kawano, San Mateo, CA (US); Greg Gilley, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 850 days.

(21) Appl. No.: 12/208,226

(22) Filed: Sep. 10, 2008

(65) Prior Publication Data

US 2009/0204895 A1     Aug. 13, 2009

Related U.S. Application Data

(60) Provisional application No. 61/196,694, filed on Feb. 11, 2008.

(51) Int. Cl.
*G06F 17/00* (2006.01)
(52) U.S. Cl. ....................................... 715/273
(58) Field of Classification Search .................. 715/273
See application file for complete search history.

(56) References Cited

U.S. PATENT DOCUMENTS

| | | | |
|---|---|---|---|
| 6,850,248 B1 * | 2/2005 | Crosby et al. .................. | 345/619 |
| 6,870,547 B1 * | 3/2005 | Crosby et al. .................. | 345/619 |
| 7,062,107 B1 * | 6/2006 | Crosby et al. .................. | 382/299 |
| 7,382,380 B1 * | 6/2008 | Crosby et al. .................. | 345/619 |
| 2001/0033303 A1 * | 10/2001 | Anderson ....................... | 345/854 |
| 2002/0054301 A1 * | 5/2002 | Iwai et al. ....................... | 358/1.2 |
| 2002/0063717 A1 * | 5/2002 | Minner et al. ................. | 345/557 |
| 2003/0231240 A1 * | 12/2003 | Wilkins et al. ............ | 348/207.99 |
| 2005/0012829 A1 * | 1/2005 | Tashiro et al. ............ | 348/231.99 |
| 2005/0052469 A1 * | 3/2005 | Crosby et al. .................. | 345/619 |
| 2005/0206658 A1 * | 9/2005 | Fagans ........................... | 345/660 |
| 2006/0125922 A1 * | 6/2006 | Albert et al. .............. | 348/207.11 |
| 2007/0196028 A1 * | 8/2007 | Kokemohr et al. ........... | 382/254 |
| 2007/0201052 A1 * | 8/2007 | Caine .............................. | 358/1.2 |
| 2008/0123976 A1 * | 5/2008 | Coombs et al. ............... | 382/238 |
| 2008/0201378 A1 * | 8/2008 | Nagahara et al. .......... | 707/104.1 |
| 2008/0279468 A1 * | 11/2008 | Shiohara ....................... | 382/254 |
| 2009/0201316 A1 | 8/2009 | Bhatt et al. | |
| 2009/0204894 A1 | 8/2009 | Bhatt et al. | |

OTHER PUBLICATIONS

Aaland, Photoshop Lightroom Adventure (O'Reilly Media, Inc., 2007) p. 21-30.*
Adobe Systems, Adobe Photoshop Lightroom User Guide for Windows and Mac OS (Adobe Systems, Inc., 2007) p. 1-135.*
Apple Computer, Aperture User Manual (Apple Computer, Inc., 2006) p. 1-476.*

(Continued)

*Primary Examiner* — Laurie Ries
*Assistant Examiner* — Frank D Mills
(74) *Attorney, Agent, or Firm* — Adeli & Tollen LLP

(57) ABSTRACT

Some embodiments provide a method that from a source external to a device, imports a first image and a lower resolution second image that corresponds to the first image into the device. The method assigns the second image as a temporary preview of the first image. The method generates a preview third image for the first image. In some embodiments, the method further selects the first image for display before generating the preview third image. The selecting causes the temporary preview image to be displayed as a preview of the first image. In some embodiments, the method further selects the first image for display after generating the preview third image. The selecting causes the preview third image to be displayed as a preview of the first image.

14 Claims, 35 Drawing Sheets

OTHER PUBLICATIONS

Updated portions of prosecution history of U.S. Appl. No. 12/208,187, Sep. 26, 2011, Bhatt, Nikhil, et al.
Portions of prosecution history of U.S. Appl. No. 12/208,187, Jun. 16, 2011, Bhatt, Nikhil, et al.
Portions of prosecution history of U.S. Appl. No. 12/208,156, Dec. 9, 2008, Bhatt, Nikhil et al.
Cuenca, Mike, "Apple Aperture 1.5: Photographers' Guide", Dec. 22, 2006, pp. 3, 23-27, 46, 69-71, 86, 149, 164-166, 226-227.

* cited by examiner

IMAGE APPLICATION PERFORMANCE OPTIMIZATION

CLAIM OF BENEFIT TO PRIOR APPLICATIONS

This application claims the benefit of U.S. Provisional Application 61/196,694, entitled "Image Application Performance Optimization," filed Feb. 11, 2008. The contents of U.S. Provisional Application 61/196,694 are hereby incorporated by reference.

CROSS REFERENCE TO RELATED APPLICATIONS

This Application is related to the following applications: U.S. Patent Application 12/208,187, now published as U.S. Patent Publication 2009/0204894, filed Sep. 10, 2008; and U.S. Patent Application 12/208,156, now published as U.S. Patent Publication 2009/0201316, filed Sep. 10, 2008.

FIELD OF THE INVENTION

The present invention relates to image processing tools and in particular to preview of images prior to editing.

BACKGROUND OF THE INVENTION

Image processing applications are tools that allow management of digital images. Image processing applications allow a user to import digital images, perform photo edits, adjust and retouch images, publish images on the web or in print, export images, and back up the images. After a group of images are imported, a user often sorts through the images to choose the images that the user wants to work with and further adjust.

One desirable feature of an image processing application is to provide high-resolution previews to allow a user to review, rate, and organize the images. Many of today's digital images are, however, very large, resulting in long delays when a user is previewing high resolution images. There is, therefore, a need in the art for an image processing application to provide quick preview of high resolution images without causing long delays when loading high-resolution images for preview.

SUMMARY OF THE INVENTION

Some embodiments provide an image editing application that allows users to quickly preview images and to edit images. In some embodiments, the image editing application provides one or more tools for organizing images. The image editing application also provides a display area for displaying a selected image. It also provides at least one tool for editing the images that are displayed in the display area.

The image-editing application further provides a quick preview tool for foregoing the loading of a particular image in the display area after the particular image has been selected. Specifically, for each particular image, the image-editing application maintains or generates a preview image. In place of a particular image, the quick preview tool when selected causes the image editing application to only load the preview image of the particular image for full or partial display in the display area. When the quick preview tool is not selected, the image editing application loads each image in its entirety for full or partial display in the display area.

The quick preview tool allows users to speed up the image editing process. This is because a user can activate the quick preview tool to load and review images quickly in the display area when the user does not need to make any edits to the images, while deactivating the quick preview tool to load images in their entirety when the user wishes to view them in their entirety. A user might wish to view an image instead of its preview in the display area because the user wishes to edit the image and the editing application of some embodiments allows a user to specify image modifications to only the actual images and not their previews.

Because the image editing application of some embodiments does not allow a user to specify image modifications when viewing preview images in the display area, the editing application of some of these embodiments makes the editing tools not accessible to a user when the quick preview tool has been selected. This provides notification to the user that the quick preview tool has been selected. Instead of or in conjunction with this notification, the image editing application of some embodiments provides other indications of the selection of the quick preview tool. Examples of such indications include placing a mark (e.g., a "Quick Preview" mark) on the display area, placing a mark (e.g., a "P") on the image, highlighting or otherwise marking a selected thumbnail of the image that is being previewed, etc.

While the editing application of some embodiments does not allow a user to specify image modifications when the quick preview tool has been activated, the editing application of other embodiments can allow a user to specify such modifications while providing quick previews. Moreover, even some embodiments that do not allow modifications during quick preview, do allow a user to exit quick preview by selecting all or some of the editing tools. These embodiments do not make the editing tools inaccessible during quick preview.

For instance, the image editing application of some embodiments provides an automated way of exiting quick preview by detecting that the user wants to perform operations (e.g., edit operations) that would require the actual image to be loaded in the display area. Some of these embodiments not only have the editing application exit quick preview in an automated way, but also have the application enter quick preview in an automated way. For instance, in some embodiments, the application exits quick preview when the user selects a cropping tool for an image, but automatically re-enter quick preview after the user is done editing the image (e.g., when selecting a non-editing tool).

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

Figure 1:
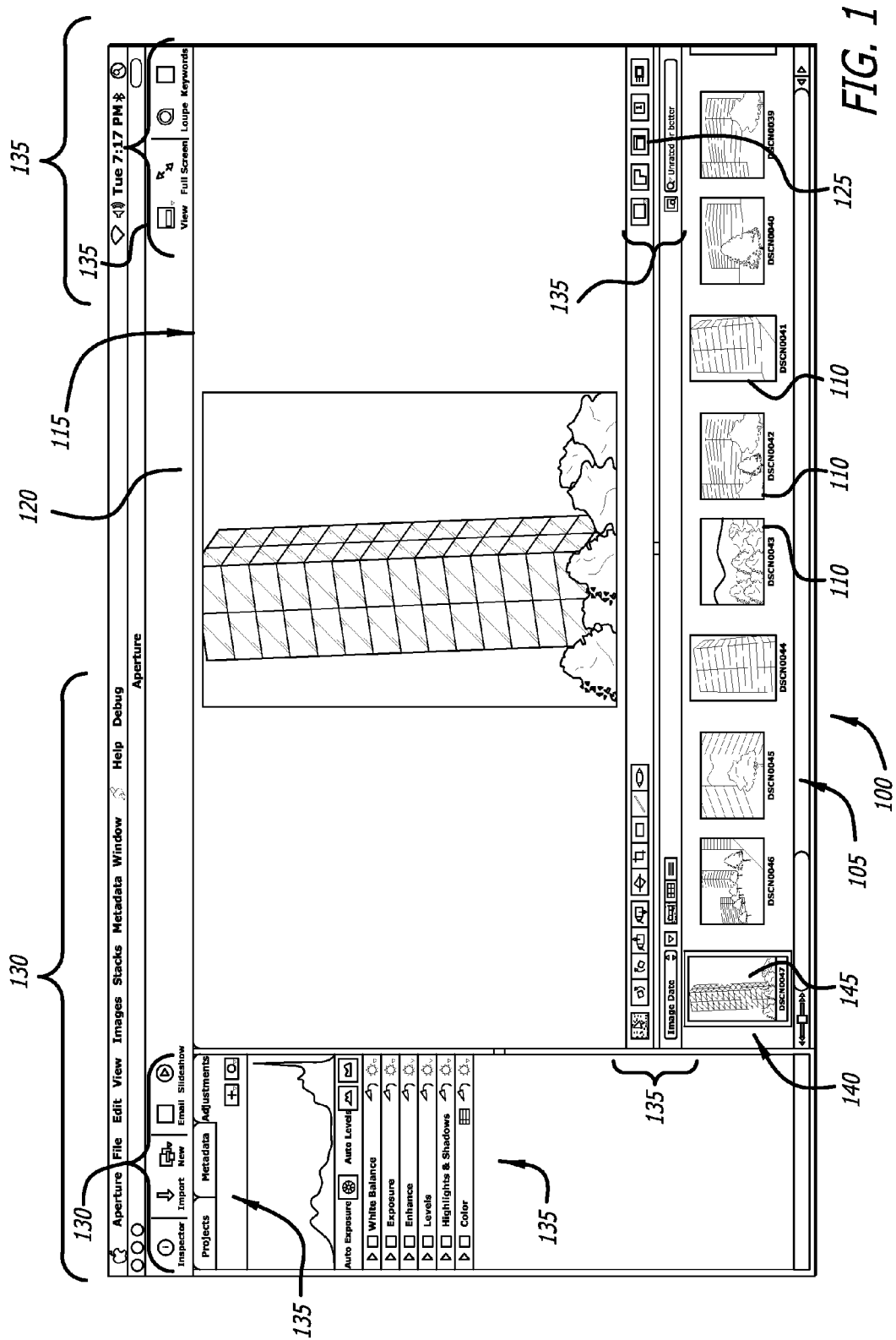
FIG. 1 illustrates an example of a user interface of an image-editing application of some embodiments.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments provide an image editing application that allows users to quickly preview images and to edit images. In some embodiments, the image editing application provides one or more tools for organizing images. The image editing application also provides a display area for displaying a selected image. It also provides at least one tool for editing the images that are displayed in the display area.

The image-editing application further provides a quick preview tool for foregoing the loading of a particular image in the display area after the particular image has been selected. Specifically, for each particular image, the image-editing application maintains or generates a preview image. In place of a particular image, the quick preview tool when selected causes the image editing application to only load the preview image of the particular image for full or partial display in the display area. When the quick preview tool is not selected, the image editing application loads each image in its entirety for full or partial display in the display area.

The quick preview tool allows users to speed up the image editing process. This is because a user can activate the quick preview tool to load and review images quickly in the display area when the user does not need to make any edits to the images, while deactivating the quick preview tool to load images in their entirety when the user wishes to view them in their entirety. A user might wish to view an image instead of its preview in the display area because the user wishes to edit the image and the editing application of some embodiments allows a user to specify image modifications to only the actual images and not their previews.

Because the image editing application of some embodiments does not allow a user to specify image modifications when viewing preview images in the display area, the editing application of some of these embodiments makes the editing tools not accessible to a user when the quick preview tool has been selected. This provides notification to the user that the quick preview tool has been selected. Instead of or in conjunction with this notification, the image editing application of some embodiments provides other indications of the selection of the quick preview tool. Examples of such indications include placing a mark (e.g., a "Quick Preview" mark) on the display area, placing a mark (e.g., a "P") on the image, highlighting or otherwise marking a selected thumbnail of the image that is being previewed, etc.

While the editing application of some embodiments does not allow a user to specify image modifications when the quick preview tool has been activated, the editing application of other embodiments can allow a user to specify such modifications while providing quick previews. Moreover, even some embodiments that do not allow modifications during quick preview, do allow a user to exit quick preview by selecting all or some of the editing tools. These embodiments do not make the editing tools inaccessible during quick preview.

For instance, the image editing application of some embodiments provides an automated way of exiting quick preview by detecting that the user wants to perform operations (e.g., edit operations) that would require the actual image to be loaded in the display area. Some of these embodiments not only have the editing application exit quick preview in an automated way, but also have the application enter quick preview in an automated way. For instance, in some embodiments, the application exits quick preview when the user selects a cropping tool for an image, but automatically re-enters quick preview after the user has performed the crop operation on the image (e.g., when selecting a non-editing tool).

The quick preview tool of some embodiments can be incorporated into any image editing application by way of a plug-in, applet, or direct function incorporated within the application itself. Accordingly, different image editing applications, such as Apple Aperture®, Apple iPhoto®, Adobe Photoshop®, and Adobe Lightroom®, may implement the quick preview tool described herein.

Such image editing applications typically have several additional functionalities in addition to editing functionalities. For instance, in some embodiments, such an application provides a set of tools for (1) organizing images into different collections of images (e.g., different digital photo albums), (2) organizing the images by tagging images with informative keywords, (3) organizing the images by marking selected images as favorites, (4) organizing the images by rating each image, etc. The image editing application can also organize the images and publish the images on the World Wide Web, or publish the images as individual image prints. The application can also organize the images into a "photo book" of images that are sent over a network in order to publish a custom photo book, where each photo book has several pages that have one or more picture fields for presenting pictures. Different photo books can differ in their size, themes, covers, page designs, page colors, picture-field designs, picture-field layouts, and/or other attributes. In some embodiments, a user can modify the page design, color, frame design, and/or other thematic aspects of a selected photo books.

In addition to stand-alone image editing applications, the quick preview tool of some embodiments can be incorporated within the functionality of an operating system such as Microsoft Windows® or Apple Mac OS®. Specifically, the quick preview tool of some embodiments can be a tool that is selectable from any folder that access files within the file system of the operating system. The quick preview tool can also be incorporated into a portable device such as a digital cameras, iPod®, mobile phone, etc.

Several more detailed embodiments of the invention are described in sections below. Specifically, Section II describes quick preview images and master images of some embodiments of the invention. Next, Section III describes different features of quick preview tool of some embodiment. Section IV then describes the quick preview processes of some embodiments. Finally, Section V provides a description of a computer system with which some embodiments of the invention are implemented.

II. Quick Preview and Master Images

A. Master Image

Some embodiments provide a nondestructive method of managing and editing images. In these embodiments, the master images are not modified during image modifications. Instead, versions of master images are created whenever changes are made to the images (such as image adjustments or changes to associated metadata). In some embodiments, these versions might be organized into albums. In some embodiments different projects can be created to include digital master files, versions, and albums.

A master image is an original digitized image. A master image might be imported into the image-editing application from camera, memory card, computer, storage, etc. A master image is often a raw image file (also referred to as RAW image file) which includes minimally processed data from the image sensor of a digital camera or an image scanner. The raw files are not processed and cannot be edited with a graphics editor. Instead, the raw file has to be converted to an RGB format such as JPEG or TIFF for editing, storage, or printing. Usually, this conversion involves precise corrections to preserve the colors of the image within a color space for a particular output device. Such corrections might involve corrections, e.g., for exposure and sharpening. Also some raw files represent image pixels as a mosaic of filtered pixel values in red, green, and blue. Converting these raw files to the RGB format requires demosaicing (or interpolation) of these image pixels values to convert the mosaic of filtered pixel values into a full RGB image. Other processing such as noise reduction or color correction is also required for raw files whether or not they are in a mosaic pattern (e.g., a Bayer pattern instead of a mosaic pattern). Also, Foveon sensors are RGB at each sensor location and still require an expensive processing step for noise reduction and color correction. Decoding a raw image could be very time consuming.

Also, any adjustments a user has made on an original need to be applied to the original prior to rendering the image. In some instances, an original may not be in raw format (e.g., when the picture is taken with a camera that generates a JPEG image). Even in these instances, an original image may take a long time to load when there are many adjustments to be made to the image prior to rendering it on the display. While it is typical for a master image to have its adjustments applied when selected, some embodiments pre-fetch a set of candidate master images and apply adjustments to them before they are selected. Some embodiments use a heuristic to determine which image (or images) a user might want to display next and apply user adjustments to these candidate images so that the user does not have to wait each time a new image is selected for display. For instance, in a grid of images presented to the user for selection, the set of candidate images may include one or more of the followings: the next image located horizontally after (i.e., on the right of) the current image, the image located horizontally before the current image, the image located above the current image, or the image located below the current image. The pre-fetch, however, does not help when the user is selecting images for display in a random order or reviewing the images in quick succession. That is why quick preview is essential for improving the performance.

B. Quick Preview Image

1. Faster and Less Resources to Decode

In some embodiments, the quick preview image shown by the quick preview tool is a high resolution image (up to the resolution of the master image) created from the master image. Quick preview images might be compressed (e.g., JPEG images) or not compressed (e.g., TIFF images).

In contrast to a master image that may be in raw format which requires a long time to decode, a quick preview image can be loaded much faster and with less resources because it is already in a format such as JPEG or TIFF format. For instance, in order to be decoded, master images may require many database accesses to inquire about information such as the type of camera used, the raw format supported by the camera, different characteristics of the image, etc. Many corrections might be required to preserve the color of the image. These processes are not required when decoding quick preview images.

2. Includes the Adjustments of the Master Image

In some embodiments, the preview image is a digitized image that includes the adjustments required for the master image. In these embodiments, the quick preview image is a rendered image with all adjustments that the master image has and, therefore, is much faster to load. Also, a quick preview image with a certain size takes the same amount of time each time it is loaded for display as opposed to the original image that takes a varying time (depending on the adjustments it needs) and often takes much longer to load.

3. Size and Compression Quality is User Controllable

In some embodiments, the size and the compression quality of the quick preview images are controlled by the user. These embodiments provide options for a user to determine the size and compression quality of quick preview images. These options provide for a tradeoff between selecting (1) larger size quick preview images which take up more storage space but have more pixels to cover a larger display area and (2) smaller size quick preview images which take less storage space but have fewer pixels. Also, a smaller quick preview image is faster to display. A user in these embodiments is, therefore, provided with an option to tradeoff between savings in time to display versus storage space by changing the size of quick preview images.

Similarly, for the embodiments that use a compressed format such as JPEG (as opposed to uncompressed format such as TIFF), a user can determine the compression quality of the quick preview image. For instance, when a compressed file is generated, the compression quality can be set to maximum to generate larger files and sharper images or the compression quality can be set to lower quality levels to generate images with more artifacts but with smaller file sizes.

4. Ancillary Processing and Display of Some Information is Skipped

In order to display metadata and other information about a master image, many database accesses and calculations are required to properly display the relevant information. For instance, metadata associated with the image such as image date, aperture, shutter speed, exposure bias, ISO speed rating, etc., need to be read from one or more databases, analyzed, and displayed.

In some embodiments, processing of some or all of this information is skipped for quick preview images, while in some other embodiments this information is made available to the user when the quick preview is enabled. Also, some embodiments may provide options for a user to selectively display all, some, or none of this information when the quick preview is enabled. Specifically, the processes that read and analyze image metadata, processes that adjust image metadata, processes that generate statistical information about the image, can be selectively set to skip some or all of their relevant processing for some or all of the image metadata.

One example of information that can be skipped for quick preview images is display of a histogram. Histograms display distribution of pixel values in the image. For instance, a histogram for luminescence may show a curve that depicts different pixel values from black to white. Generation of such a histogram can be very time consuming since every pixel in the master image must be accessed to generate the histogram. Some embodiments skip generation and display of the histograms when the quick preview is enabled. Other embodiments provide an option to selectively skip generation of histograms when quick preview is enabled.

C. Differences between a Regular Thumbnail and a Quick Preview Image

Like a quick preview image, a regular thumbnail image can be a compressed (such as a JPEG) or not compressed (such as TIFF) representation of the image. However, in some embodiments, a quick preview image is different than a regular thumbnail. For instance, in some embodiments, generation of one or several thumbnails for each image is mandatory while generation of a quick preview is optional.

Also, in some embodiments, the size and the compression quality of the quick preview images are controlled by the user while the size and the compression quality of thumbnails are determined by the image-editing tool. Also the sizes of quick preview images are generally larger than the size of regular thumbnails. For instance, a regular thumbnail may have a size of 32 pixels, 256 pixels, or 1024 pixel while the size of the quick preview images may be larger than 1280 pixels. All pixel sizes or resolutions in this disclosure are given for the long side of the image (i.e., the height of a portrait image or the width of a landscape image). The preview image and the thumbnail images can be viewed as different versions of the master image that have less information than the master image and are used in some embodiments to quickly display the images.

III. Quick Preview Features

In some embodiments, the image-editing application provides a quick preview tool for foregoing the loading of a particular image in the display area after the particular image has been selected. Specifically, for each particular image, the image-editing application maintains or generates a preview image of the particular image.

In place of a particular image, the quick preview tool when selected causes the image editing application to only load the preview image of the particular image for full or partial display in the display area. When the quick preview tool is not selected, the image editing application loads each image in its entirety for full or partial display in the display area.

Several features of the quick preview tool of some embodiments will now be described by reference to FIGS. 1-26. These features are features of an image-editing application in some embodiments. Before describing these features, a brief overview of the image-editing application is provided in subsection A.

A. Image-Editing Application Overview

Some embodiments provide an image editing and/or image management application. For simplicity, this application is referred to as the image editing application. In some embodiments, the image editing application includes a graphical user interface through which a user can view, edit, and manage images.

FIG. 1 illustrates an example of a user interface 100 of the image-editing application of some embodiments. As shown, the user interface includes a thumbnail display area 105 for displaying a set of thumbnail images 110. In some embodiments, these thumbnails are quick preview images (e.g., they include all adjustments of the master image) while in some other embodiments these thumbnails are regular thumbnails (e.g., do not include the master image adjustments). The user interface also includes an image display area (also called a viewer, or viewing area) 115 for displaying one or more images 120 in more detail.

The user interface provides the option for displaying the image display area 115, the thumbnail display area 105, or both. The user interface also provides a set of menus 130 as well as a set of controls (and tools) 135 to facilitate editing, storing, filtering, stacking (i.e., grouping together), and otherwise manipulating of the images. In some embodiments, an image is displayed in the image display area 115 when a user selects an image to be loaded by clicking on one of the thumbnails 110, loading a file through a menu selection, importing a file from a device (e.g., a camera, a hard drive, a memory card), etc.

Figure 2:
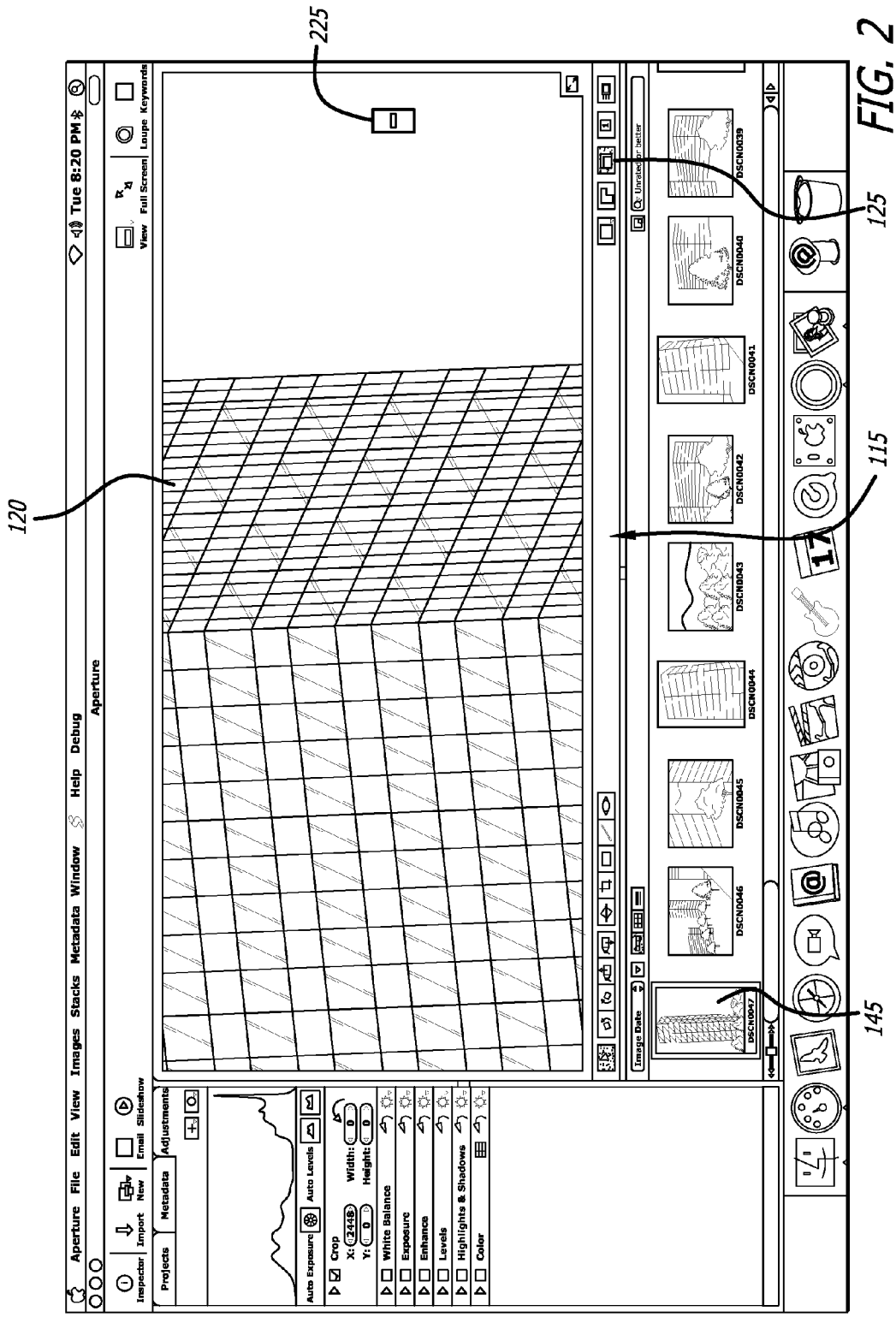
FIG. 2 illustrates an image displayed in some embodiments after a control is selected to display the image in full size.

As shown in FIG. 1, images displayed in the image display area 115 can be scaled to fit the display area 115. Images can also be displayed in full size using a control 125, through a menu selection, or a short cut key. FIG. 2 illustrates the image 120 displayed after the control 125 is selected to display the image in full size in some embodiments. As shown in both FIGS. 1 and 2, the thumbnail 145 of the same image is selected. Since a full size image may not fit in the image display area 115, some embodiments provide a visual indicator 225 to identify the portion of the image 120 currently being displayed in the image display area 115. More features and operations of the image-editing tool of some embodiments will now be described.

B. Switching between Quick Preview and Master Images

1. Fast Enabling and Disabling of Quick Preview

Figure 3:
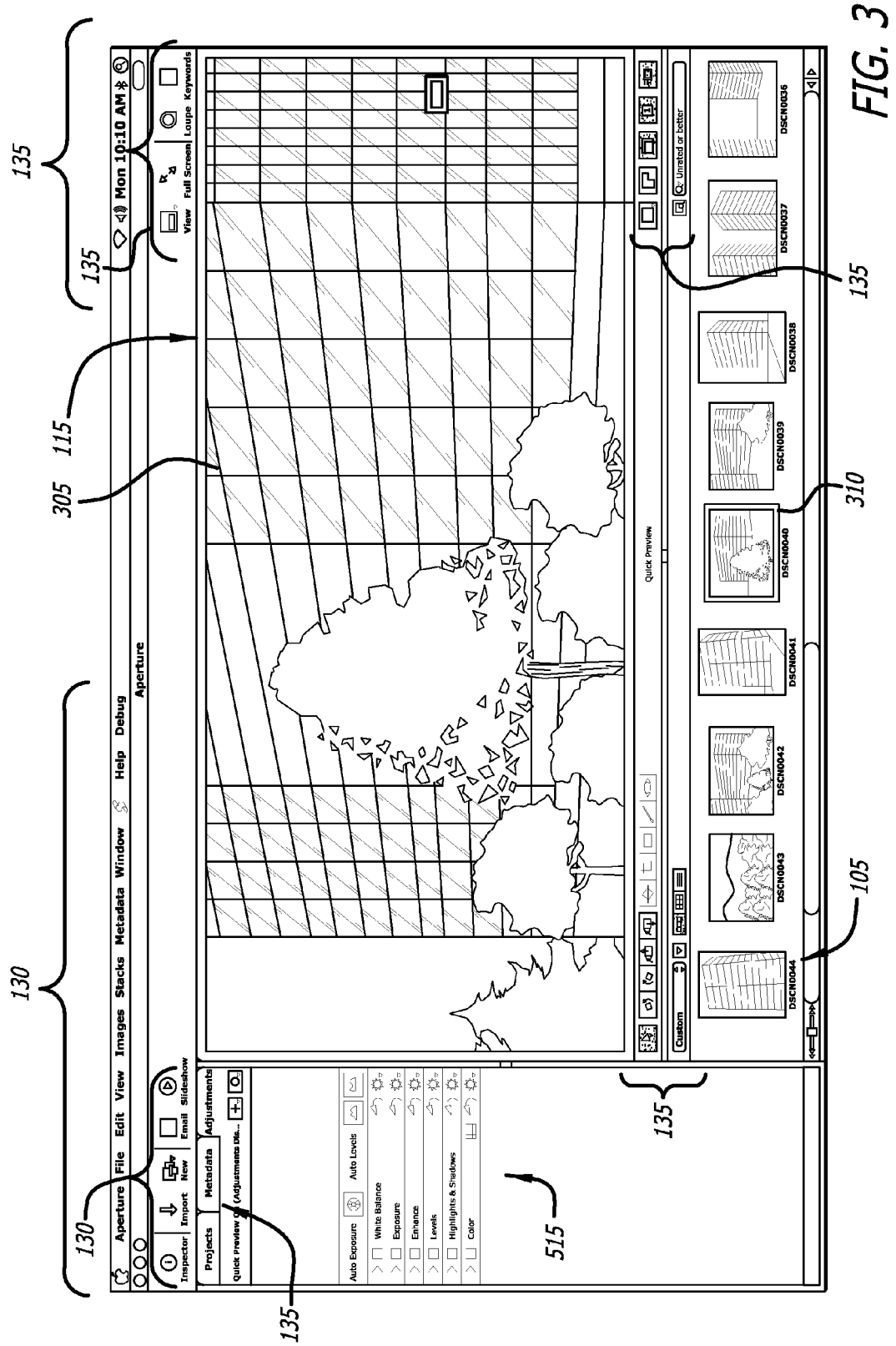
FIG. 3 illustrates a quick preview image displayed when quick preview is enabled in some embodiments.
Figure 4:
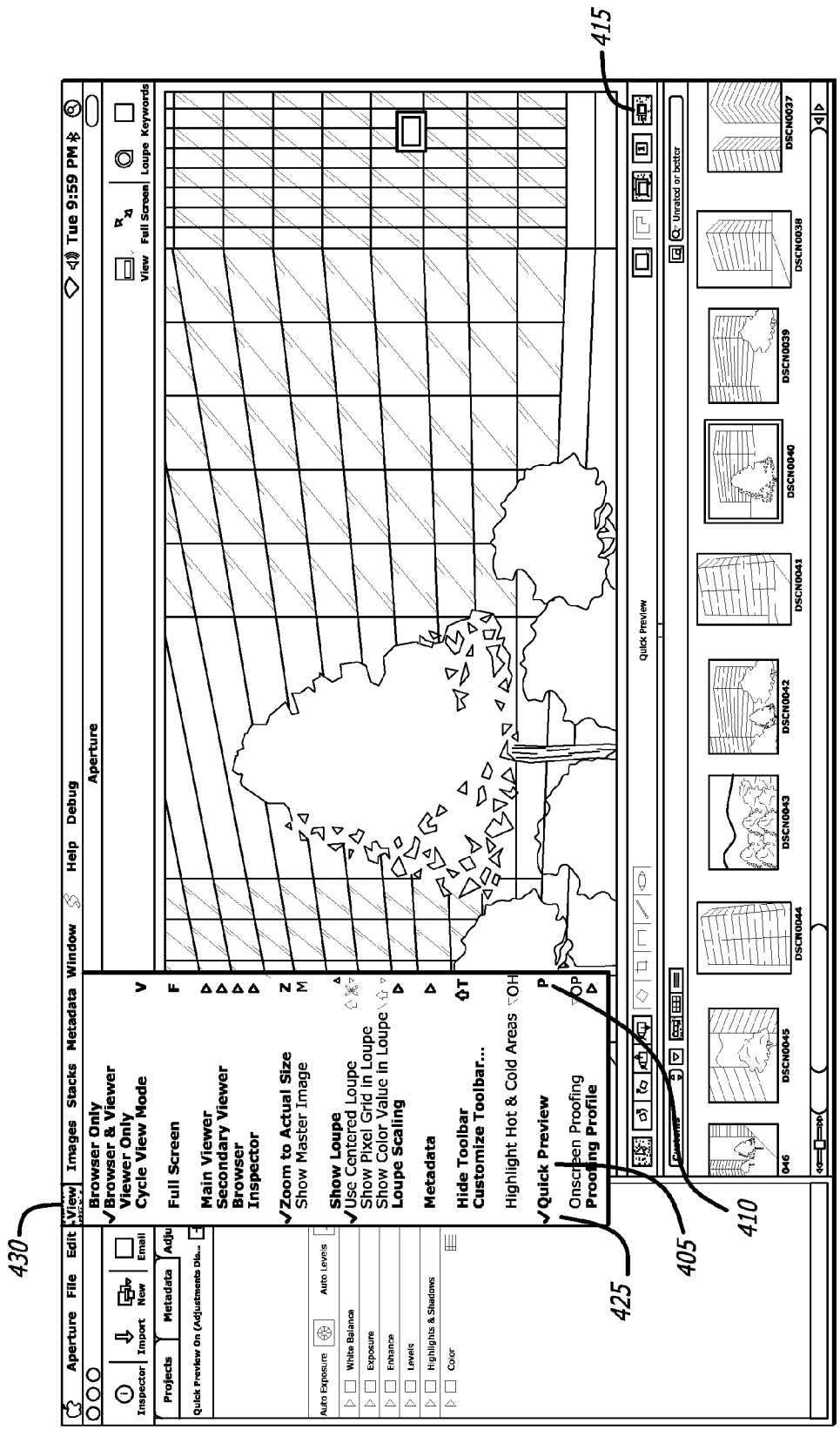
FIG. 4 illustrates several ways of enabling and disabling quick preview in some embodiments.

Some embodiments provide quick ways for enabling and disabling the quick preview. FIG. 3 illustrates an image 305 displayed with quick preview enabled in some embodiments. Different embodiments provide one or more options to switch between master and quick preview images. For instance, FIG. 4 illustrates the user interface and displayed image as in FIG. 3 after a drop down menu 430 is activated. As shown, a menu selection 405 is provided to switch the quick preview on or off. A check mark 425 next to the menu selection 405 indicates that the quick preview is currently enabled. In some embodiments, typing a single short cut key command such as "P", or a combination of keys, also switches the quick preview on and off. As shown in FIG. 4, the menu also shows the short cut key 410 assigned to switching the quick preview mode. Also, some embodiments provide an icon 415 to switch the quick preview mode on or off.

Some embodiments provide other ways of switching between the master image and quick preview image. For instance, some embodiments automatically switch between the two images under certain circumstances. These embodiments are described in Section IV, below.

2. Turning Quick Preview On or Off without a Modal Switch

Figure 5:
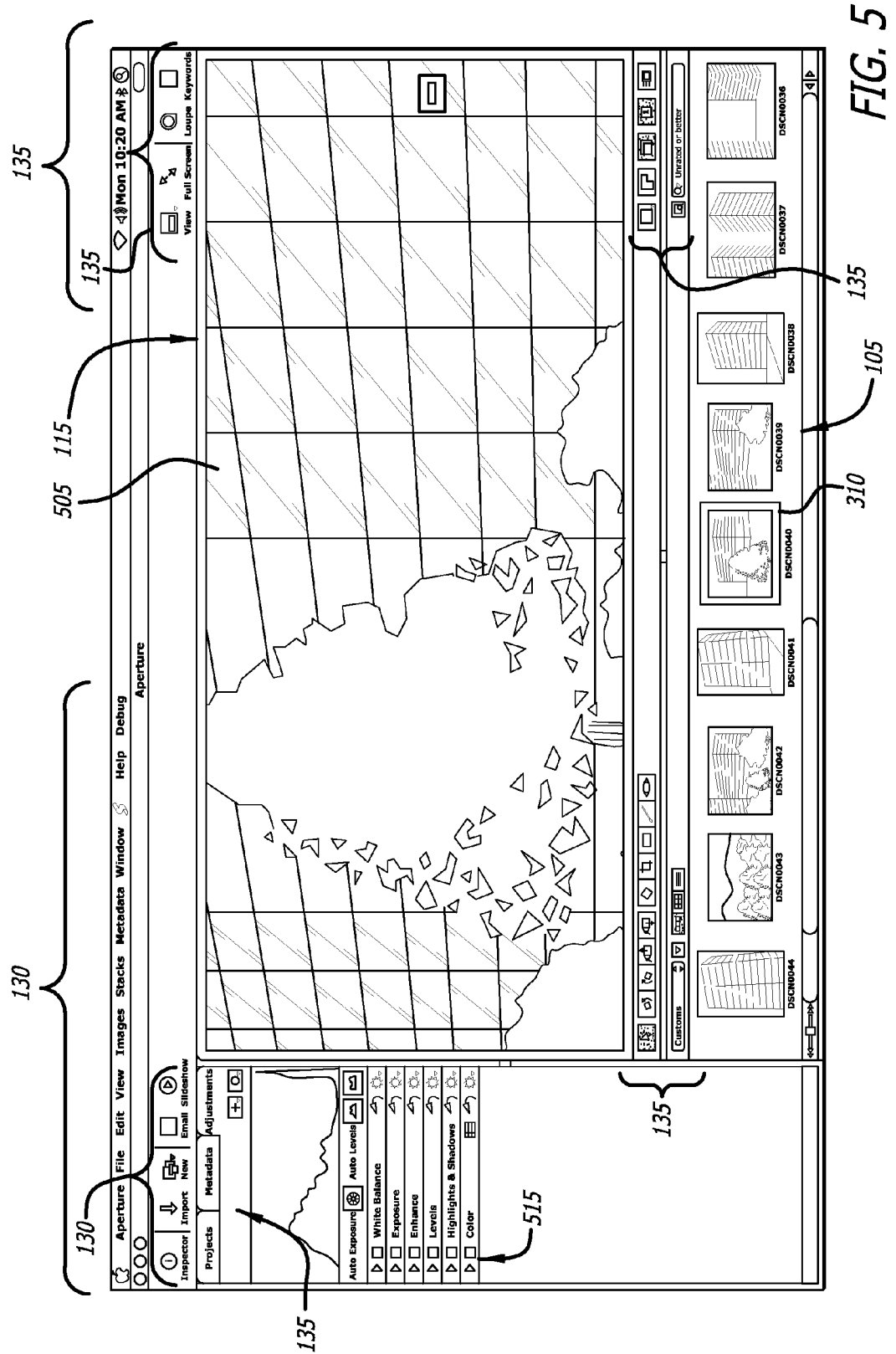
FIG. 5 illustrates a master image displayed when quick preview is turned off in some embodiments.

Some embodiments turn quick preview on or off without requiring the image editing application to perform a modal switch. FIG. 5 illustrates the master image 505 displayed after one of the above mentioned menu selection, short cut key, or icon is utilized to disable the quick preview mode. As shown, in both FIGS. 3 and 5 the same image (as indicated by the selected thumbnail 310) is selected for display. The image display area 115, the thumbnail display area 105, the menus 130, the tools 135 and 515 also remain the same.

As can be appreciated from FIGS. 3 and 5, switching between quick preview image and the master image does not cause a modal change in the user interface. Instead, switching between the two images only causes the displayed image and its associated visual cues to be changed without changing the appearance of the user interface of the image editing application. In both cases, the same user interface layout is maintained. The general appearance of the screen and the associated tools, menus, controls, and icons remain the same. In other words, the workspace when the quick preview is enabled or disabled does not change. Instead, only certain tools and display of certain information are turned on or off.

Also, when a quick preview image is displayed, some or all of the editing tools in some embodiments are disabled to prevent making adjustments to the images. As shown in FIG. 5, a set of image editing tools 515 are available for editing the master image 505. FIG. 3 also displays, without a modal change to the user interface, the same editing tools 515 except that the tools are disabled (shown as grayed out to indicate that the quick preview image 305 cannot be edited).

C. Saving Time and Resources Associated with Loading an Image

When an image is selected for display in the image display area, some embodiments first display a regular thumbnail image as the larger master is being loaded from the storage and adjusted for display. Some embodiments make these adjustments each and every time an image is being loaded. Also, when the original is in raw format, the raw image file has to be decoded prior to applying the adjustments.

Once the master image is fully accessed, then the master is displayed on the screen. The process of displaying the thumbnail and the master can cause a delay when the master image is large and/or requires adjustments. As a result, for some master images, the image displayed in the image display area might not be sharp for at least a few seconds.

Figure 6:
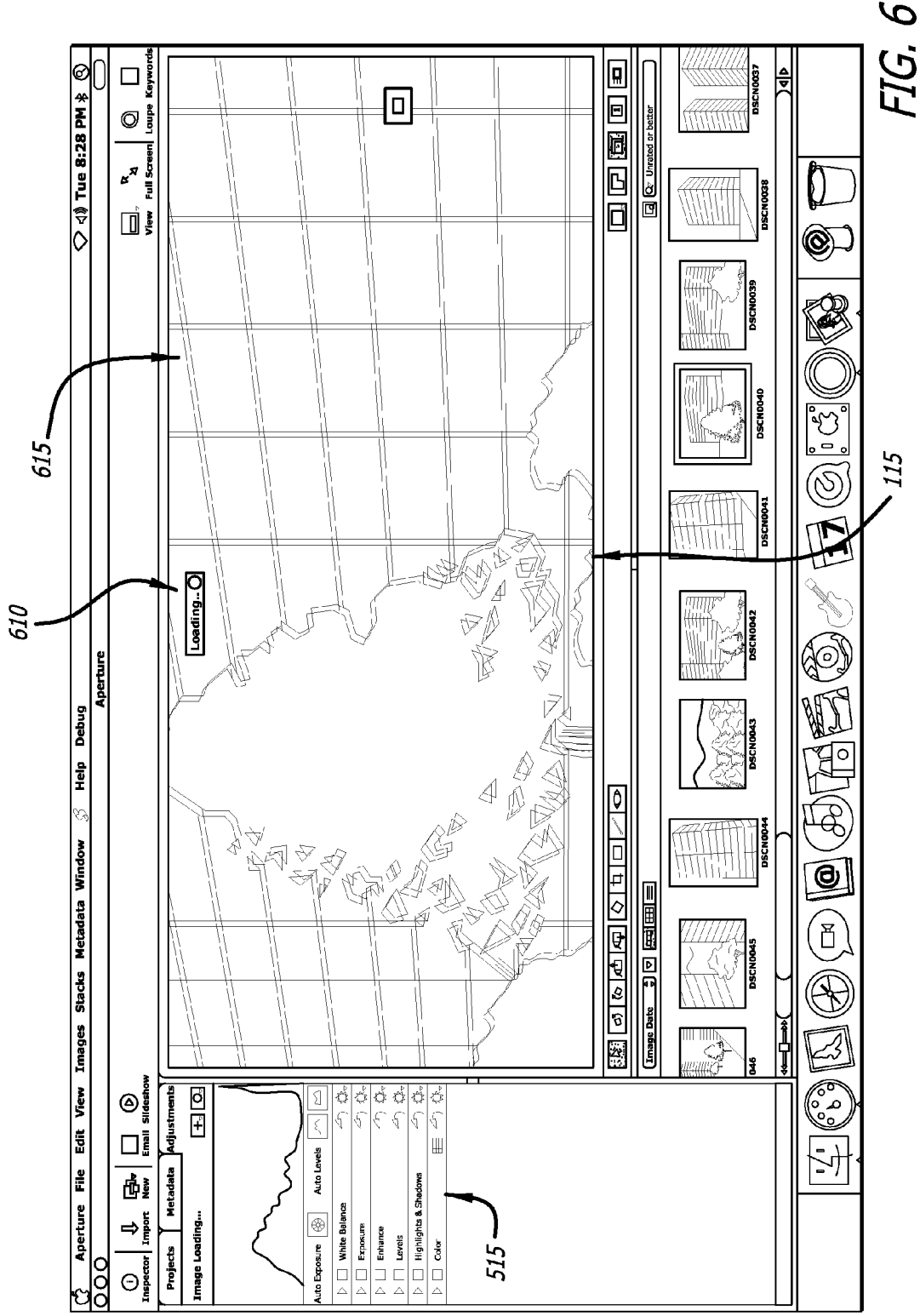
FIG. 6 illustrates an image that is being loaded for display in the image display area of some embodiments when the quick preview is turned off.
Figure 7:
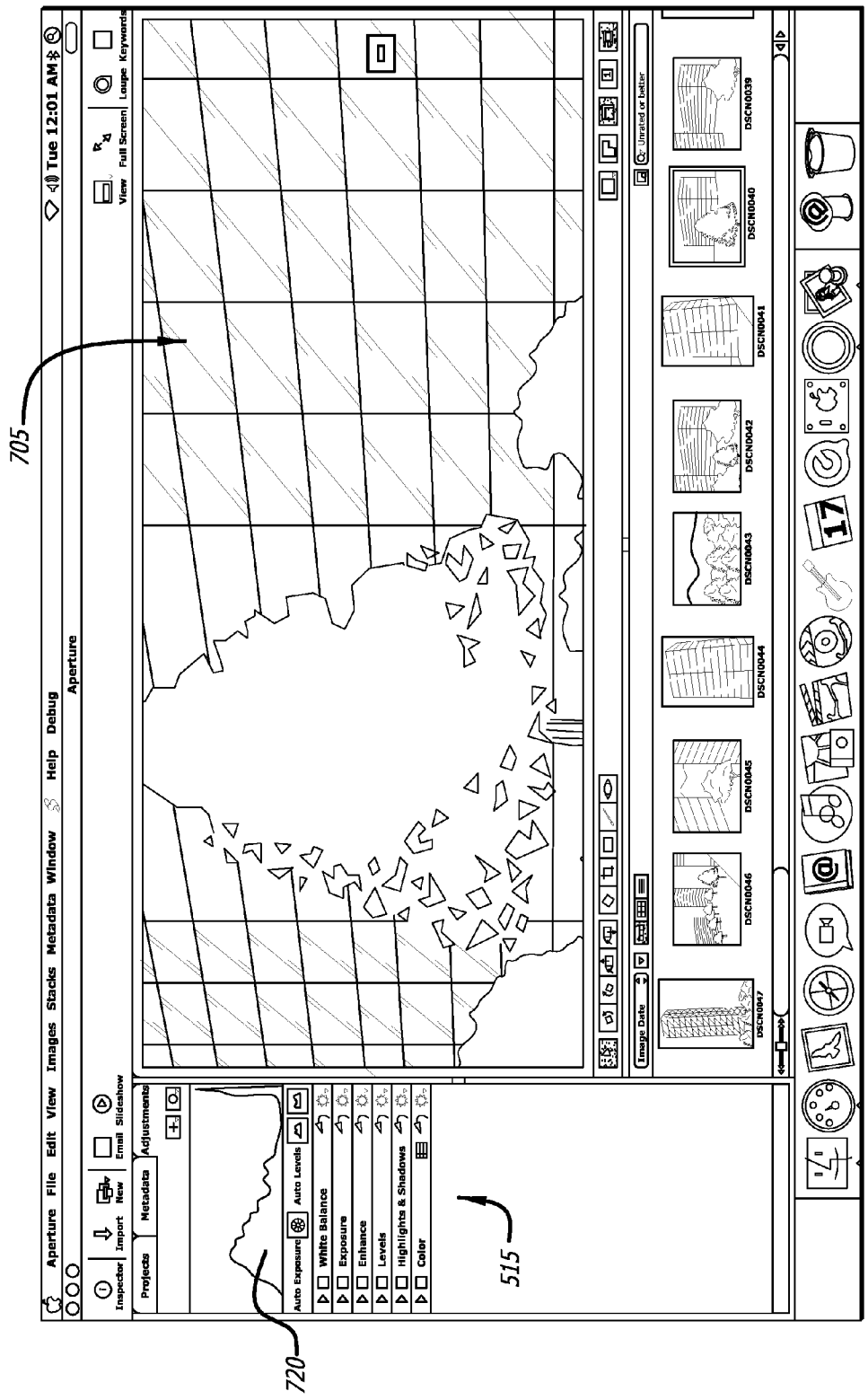
FIG. 7 illustrates the same image of FIG. 6 after being loaded.

FIG. 6 illustrates an image that is being loaded for display in the image display area 115 of some embodiments. Some embodiments provide a visual cue 610 to indicate that the image is being loaded. As shown, during the loading process, a thumbnail image 615 which is not as sharp as the master image is displayed in the image display area 115. While a master image is being loaded, the editing tools 515 are temporarily disabled as indicated by these editing tools 515 being grayed out. FIG. 7 illustrates the master image after being loaded. As shown, the image 705 is sharp and the editing tools 515 are enabled. The delay associated with displaying a large master image becomes more significant when a user has to go through several master images to sort, stack, select, or otherwise manipulate them.

The quick preview not only saves time and resources by foregoing the loading of the master image, but also saves time and resources in some embodiments by foregoing numerous ancillary processes that the image editing application performs in some embodiments in conjunction with the loading of the master image. These processes include database queries for the image metadata, processes required to analyze and display the image metadata, processes to compute and display statistical information (such as histograms) for the image. Some or all of these processes are skipped in some embodiments to further save resources as well as to speed up loading of the quick preview image. For instance, FIG. 7 also shows a histogram 720. As described in Section II, histograms display distribution of pixel values in the image. The histogram for luminescence that is displayed in FIG. 7 shows a curve that depicts different pixel values from black to white. In some embodiment, display of this histogram is skipped when the image is displayed when the quick preview is enabled. As can be seen, this histogram is not shown when the quick preview image 305 is displayed in FIG. 3.

Instead of displaying the large master image which takes a long time and a lot of resources to load, a quick preview image can be displayed. The quick preview tool allows users to speed up the image editing process. This is because a user can activate the quick preview tool to load and review images quickly in the display area when the user does not need to make any edits to the images, while deactivating the quick preview tool to load images in their entirety when the user wishes to view them in their entirety. A user might wish to view an image instead of its preview in the display area because the user wishes to edit the image and the editing application of some embodiments allows a user to specify image modifications to only the actual images and not their previews.

D. Visual Cues for Quick Preview Mode

Figure 8:
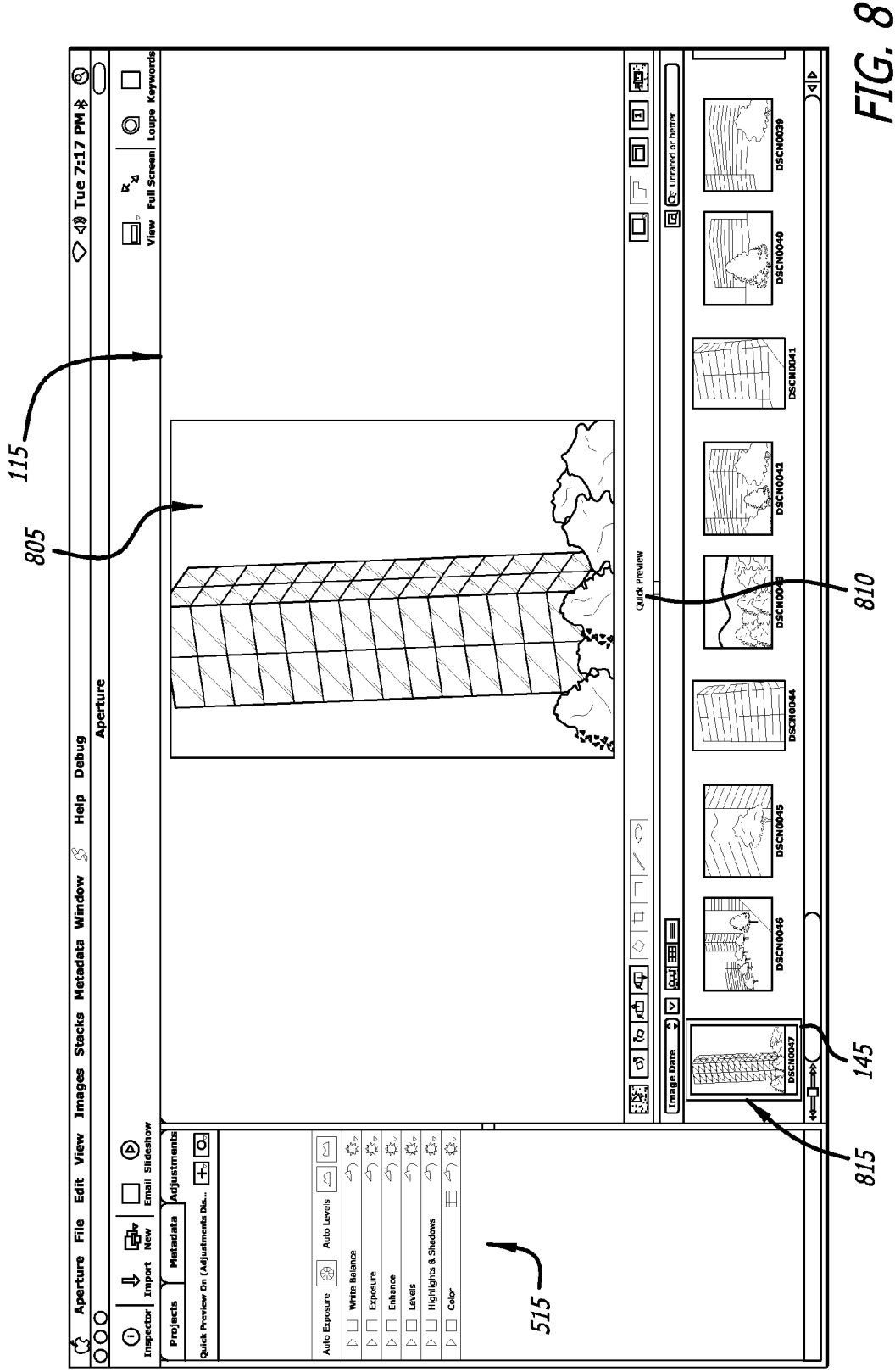
FIG. 8 illustrates an image that is displayed in quick preview mode in some embodiments.

FIG. 8 illustrates a quick preview image 805 that is displayed when the quick preview is enabled in some embodiments. In the figure, the quick preview is identified by several visual indicators. For instance, a Quick Preview mark 810 is placed on the image display area 115 to indicate that quick preview is turned on.

Also, the thumbnail 145 of the displayed image 805 is identified with a different highlight (or different border color) when the quick preview mode is on. For instance, the thumbnail of a displayed image may be highlighted with a yellow border 815 when quick preview is activated. However, when quick preview is not enabled, the thumbnail is highlighted with a different color, e.g., with a white border.

Figure 9:
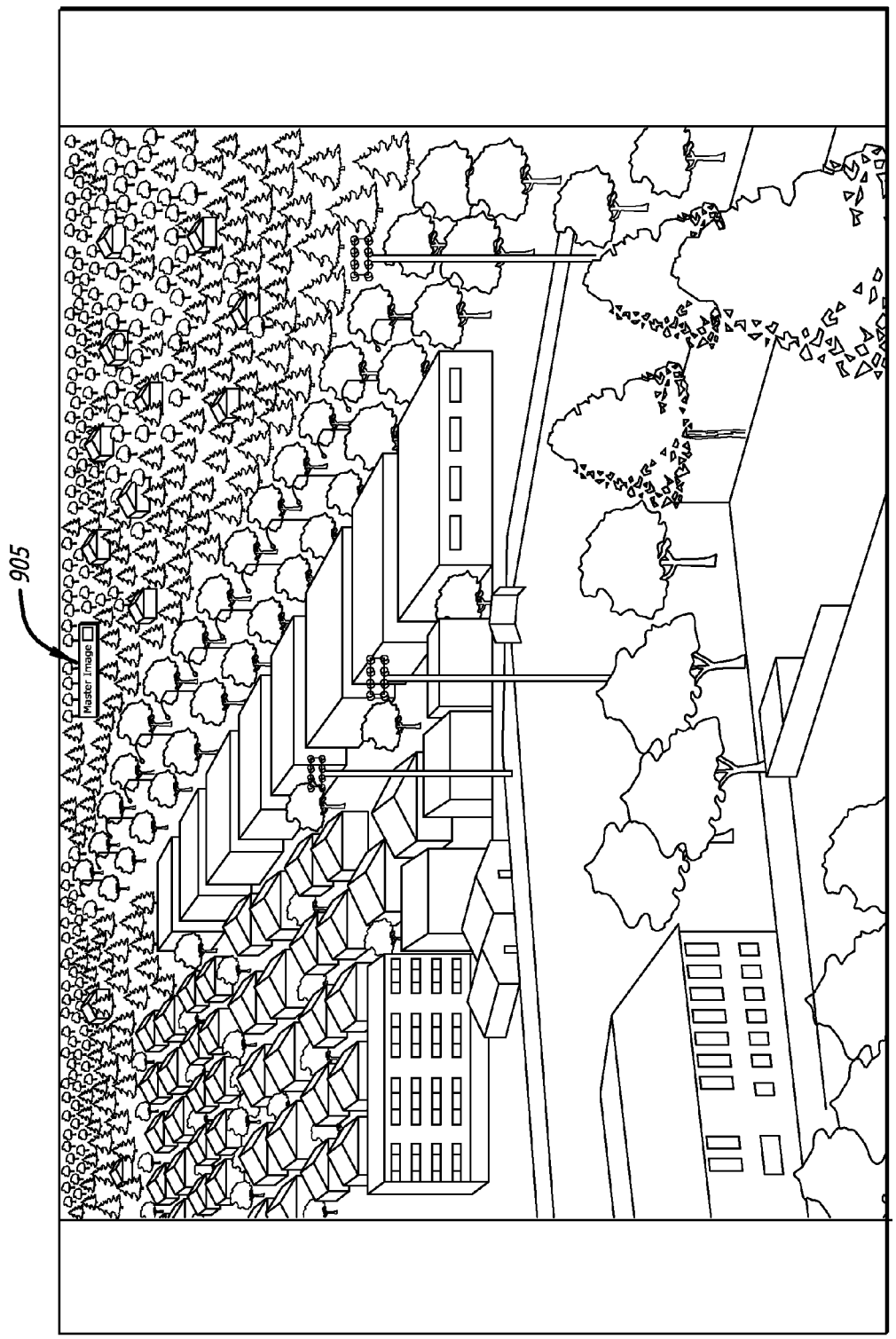
FIG. 9 illustrates a master image in some embodiments with a visual cue placed on it to indicate that a master image is currently displayed.

Some embodiments provide an option to place a mark on the image to indicate that a master image is displayed and, therefore, infer that quick preview is disabled. For instance, FIG. 9 illustrates a master image displayed on full screen when the quick preview is disabled in some embodiments. As shown, a visual cue 905 is optionally placed on the image to indicate that the currently displayed image is a master image and, therefore, quick preview is disabled.

Figure 10:
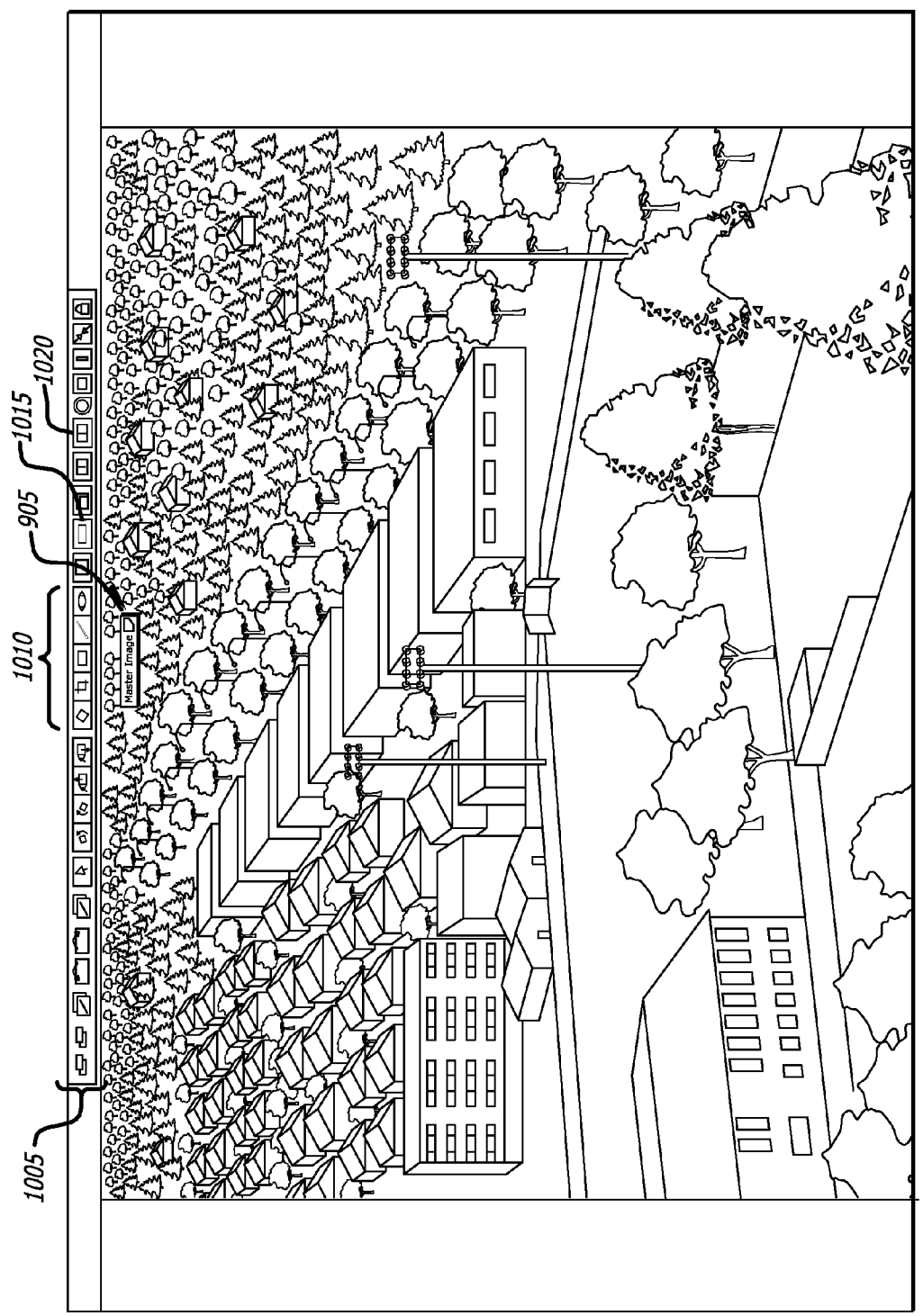
FIG. 10 illustrates a master image and a menu displayed on full screen when the quick preview is disabled in some embodiments.

Furthermore, some embodiments provide additional ways to aid in identifying whether quick preview is turned on or off. FIG. 10 illustrates a master image displayed on full screen when the quick preview is disabled in some embodiments. When the cursor (not shown) is moved towards the upper part of the screen, a menu 1005 is displayed. As shown, a set of editing tools 1010 are activated. Also, an icon 1015 which turns the visual cue 905 on or off is highlighted (e.g., with a light background) to indicate that the quick preview is off and master images can be identified by turning visual cue 905 on. Also, another icon 1020 that switches the quick preview on or off is highlighted (e.g., shown by a lighter background) to indicate that quick preview is currently turned off.

Figure 11:
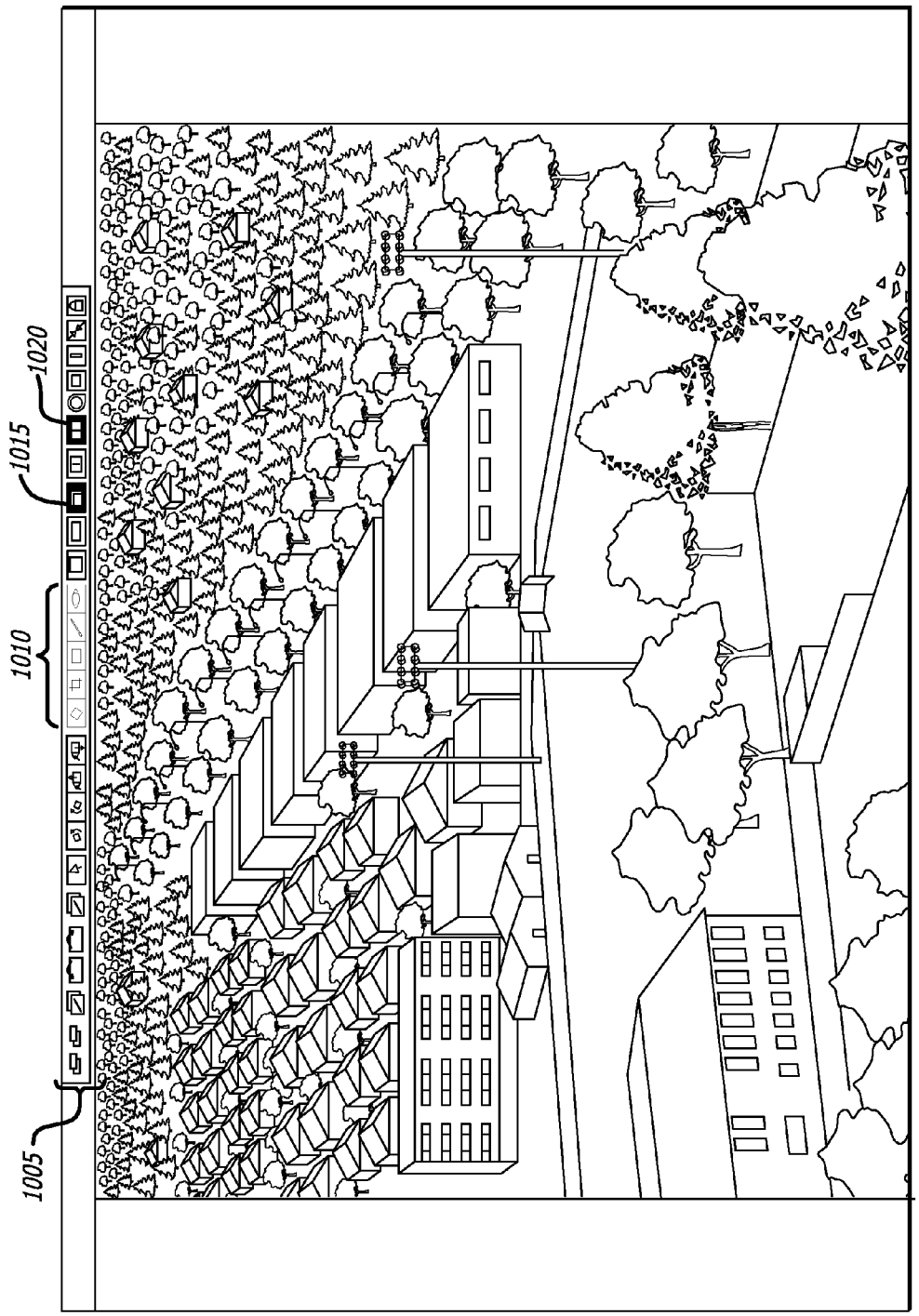
FIG. 11 illustrates the image of FIG. 10 when the quick preview is enabled.

In contrast, FIG. 11 illustrates the image of FIG. 10 when the quick preview is turned on. When the cursor (not shown) is moved towards the upper part of the screen, the menu 1005 is displayed. Because quick preview is enabled, the set of editing tools 1010 is shown as disabled (i.e., the associated icons are grayed out). Furthermore, the visual cue 905 (shown in FIGS. 9 and 10) is no longer displayed. In addition, the icon 1015 in FIG. 11 is highlighted differently than in FIG. 10 (e.g., is highlighted with a darker background) to indicate that quick preview is disabled. Also, icon 1020 which is used to switch quick preview on or off is highlighted differently (e.g., is highlighted with a darker background) than in FIG. 11.

Figure 12:
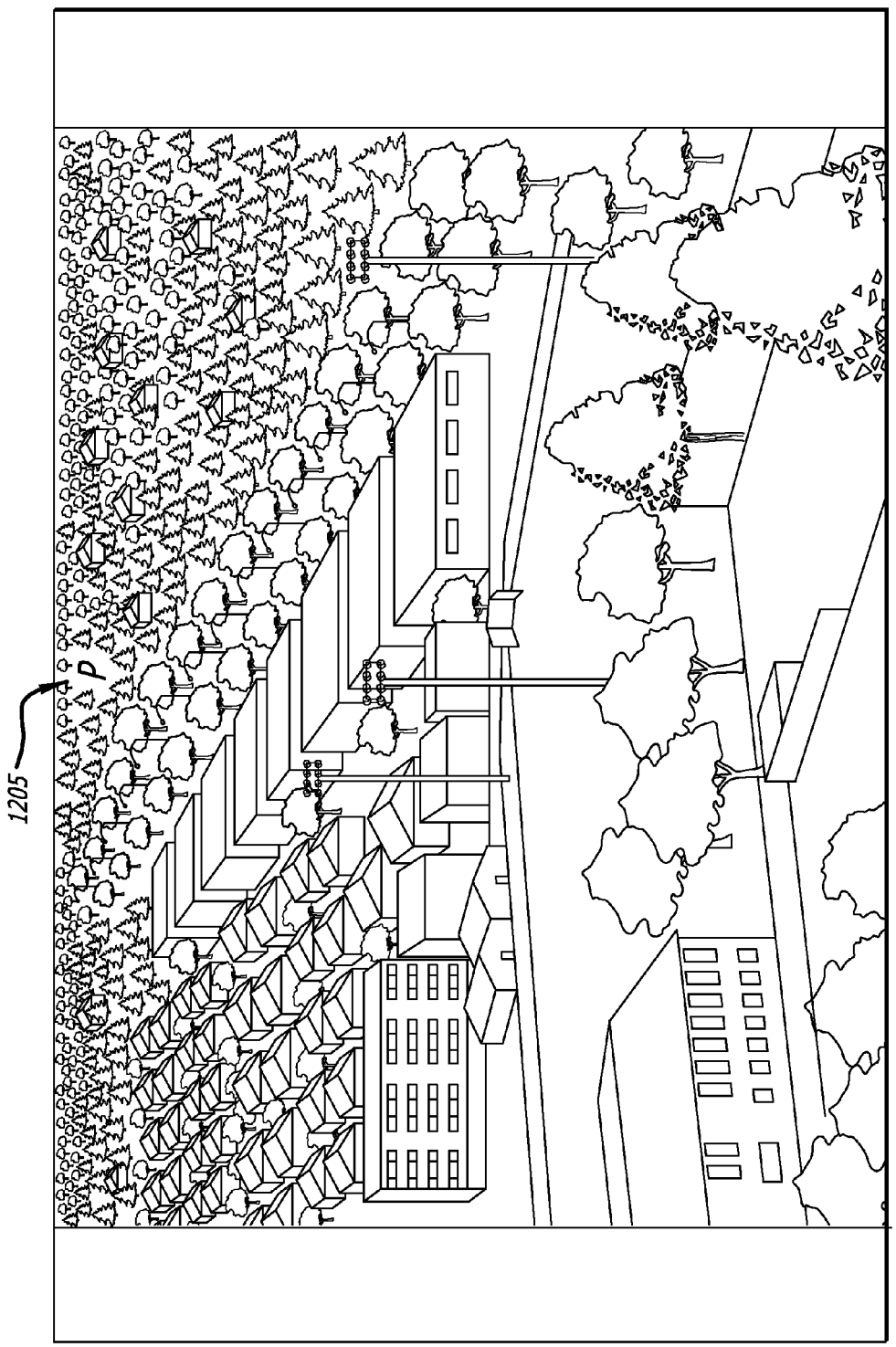
FIG. 12 illustrates a quick preview image displayed on full screen with a visual cue to indicate that the quick preview is on in some embodiments.

Also, some embodiments place a mark (e.g., a "P") on the image to indicate that quick preview is activated. FIG. 12 illustrates a quick preview image displayed in full screen mode in some embodiments. As shown, a visual cue 1205 (letter "P") is placed on the image to indicate that quick preview is activated. Some embodiments provide options to turn such an indication on or off.

Figure 13:
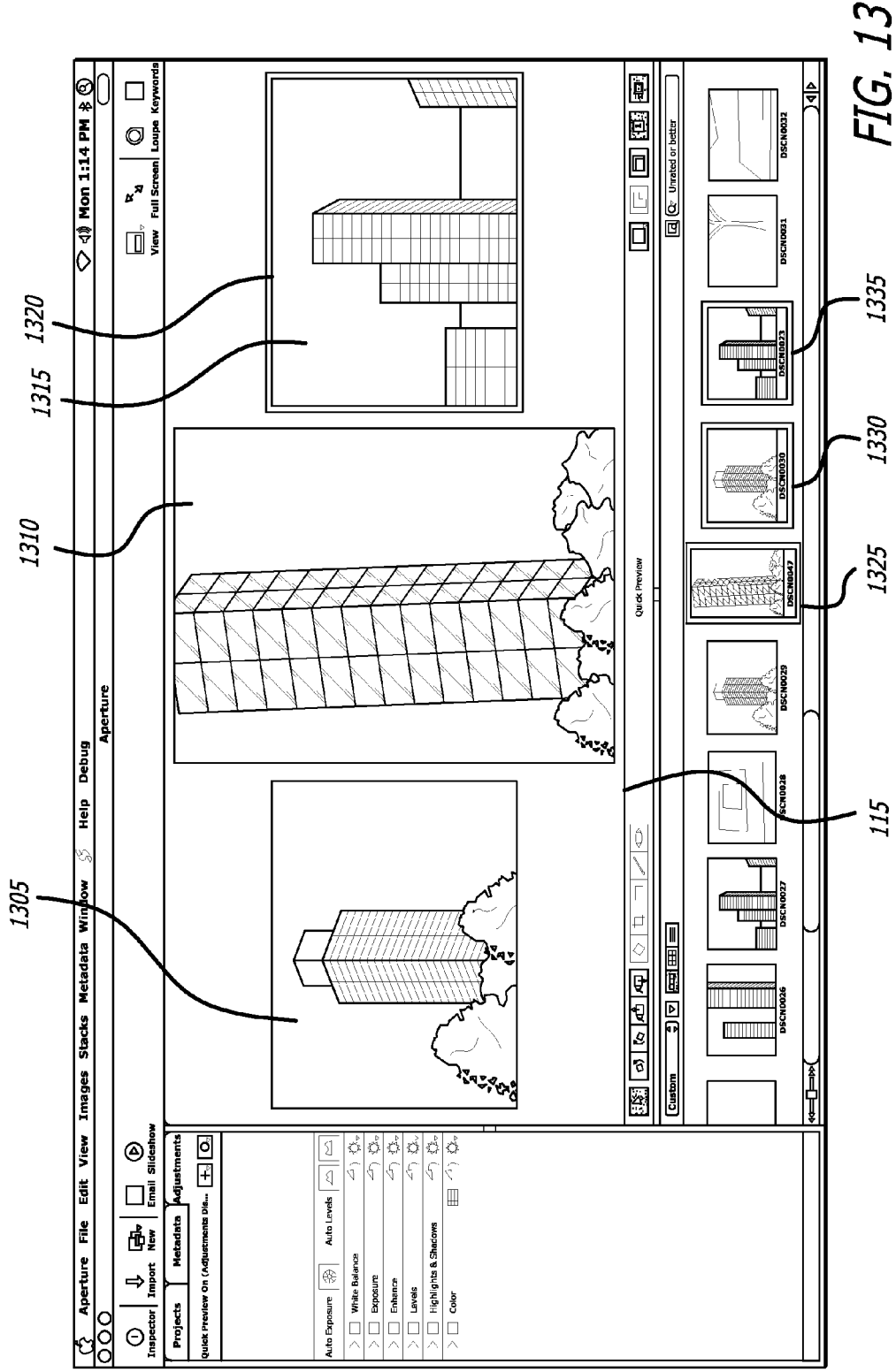
FIG. 13 illustrates several quick preview images displayed in the image display area of some embodiments.

Some embodiments also highlight the displayed image with a different color to distinguish a quick preview image from a master image. In some of these embodiments, the highlight is applied only when more than one image is displayed on the image display area at once. FIG. 13 illustrates three quick preview images 1305-1315 displayed in the image display 115 area of some embodiments. As shown, the border 1320 of the currently selected image 1315 is highlighted with a certain color, e.g., yellow.

In these embodiments, when the same three images are displayed with the quick preview disabled, the borders are highlighted with a different color, e.g., white to provide a visual cue as to whether the quick preview is on or off. Also, some embodiments in addition to highlighting the currently selected image, highlight the other images in the image display area with the same color (e.g., the borders are highlighted with the same color) but with a narrower border line to further identify which image is currently selected and whether the quick preview is on or off. Also, as shown in FIG. 13, the borders of the three thumbnails 1325-1335 associated with the displayed images 1305-1315 are also highlighted. Furthermore, the border of the thumbnail 1335 associated with the currently selected image 1315 is highlighted with a thicker border to further identify the selected image.

Figure 14:
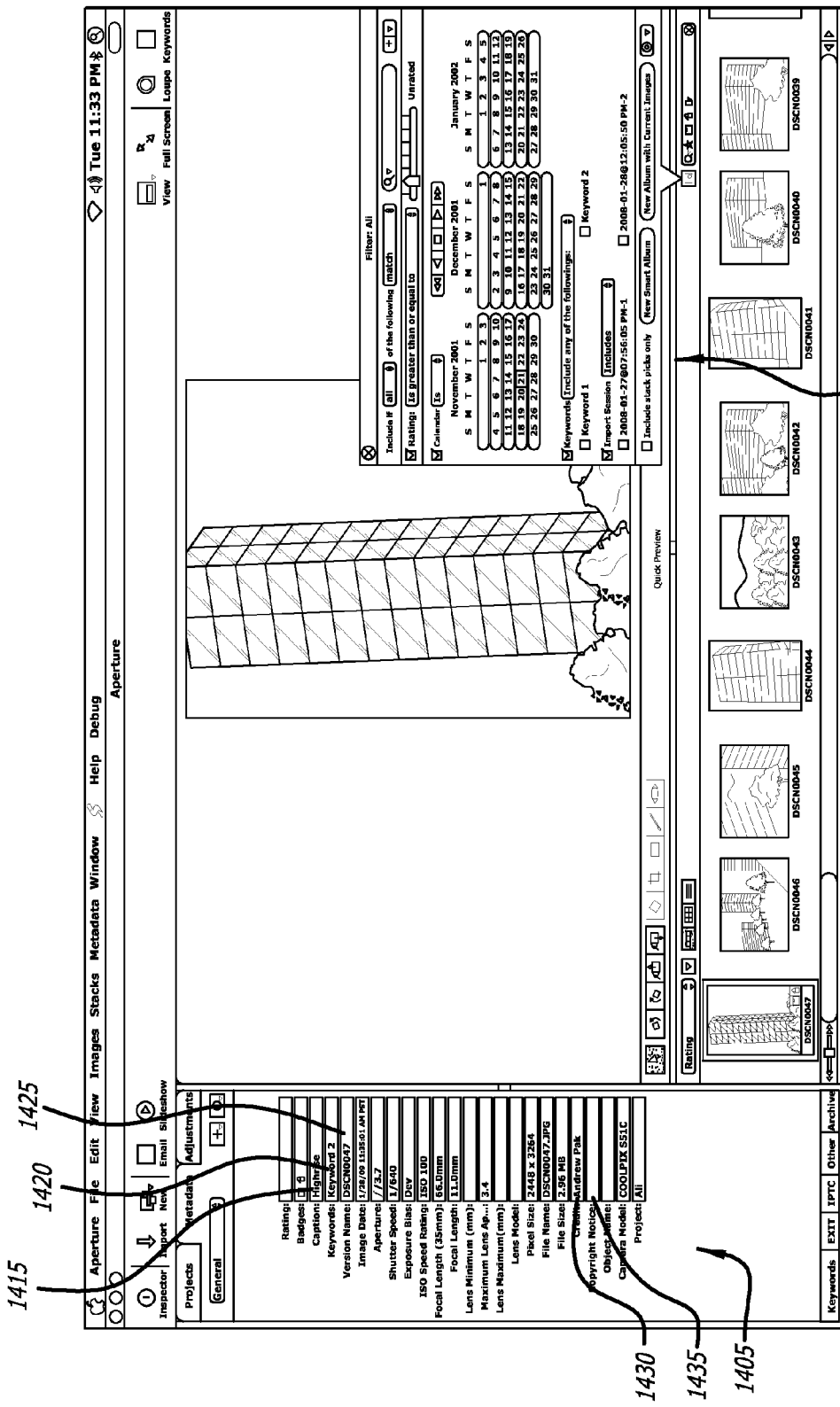
FIG. 14 illustrates controls and tools in some embodiments for a user to select and stack images, add keywords or change other metadata associated with the image when the quick preview is enabled.

Also, in some embodiments, when a quick preview image is displayed, some of the editing tools 515 (shown in FIG. 8) are disabled to prevent making adjustments to the images. However, in some embodiments, a user can still select and stack images, add keywords or change other metadata associated with the image. FIG. 14 illustrates the user interface of FIG. 8 with a set of tools selected for filtering 1410 as well as tools 1405 adding/modifying captions 1415, keywords 1420, version name 1425, credit 1430, copyright notice 1435, and other metadata.

Filtering images allows a user to only display the thumbnails of certain images that satisfy a certain criteria, e.g., the images that have a certain rating or keyword. Some embodiments also provide tools (not shown) for stacking images which allow a set of similar or related images to be grouped together. The user can identify one image from a stack to be selected for use. Also, some embodiments allow a group of images to be stacked together when they are imported into the image-editing application.

E. Selecting the Size and Other Options for the Quick Preview Images

Figure 15:
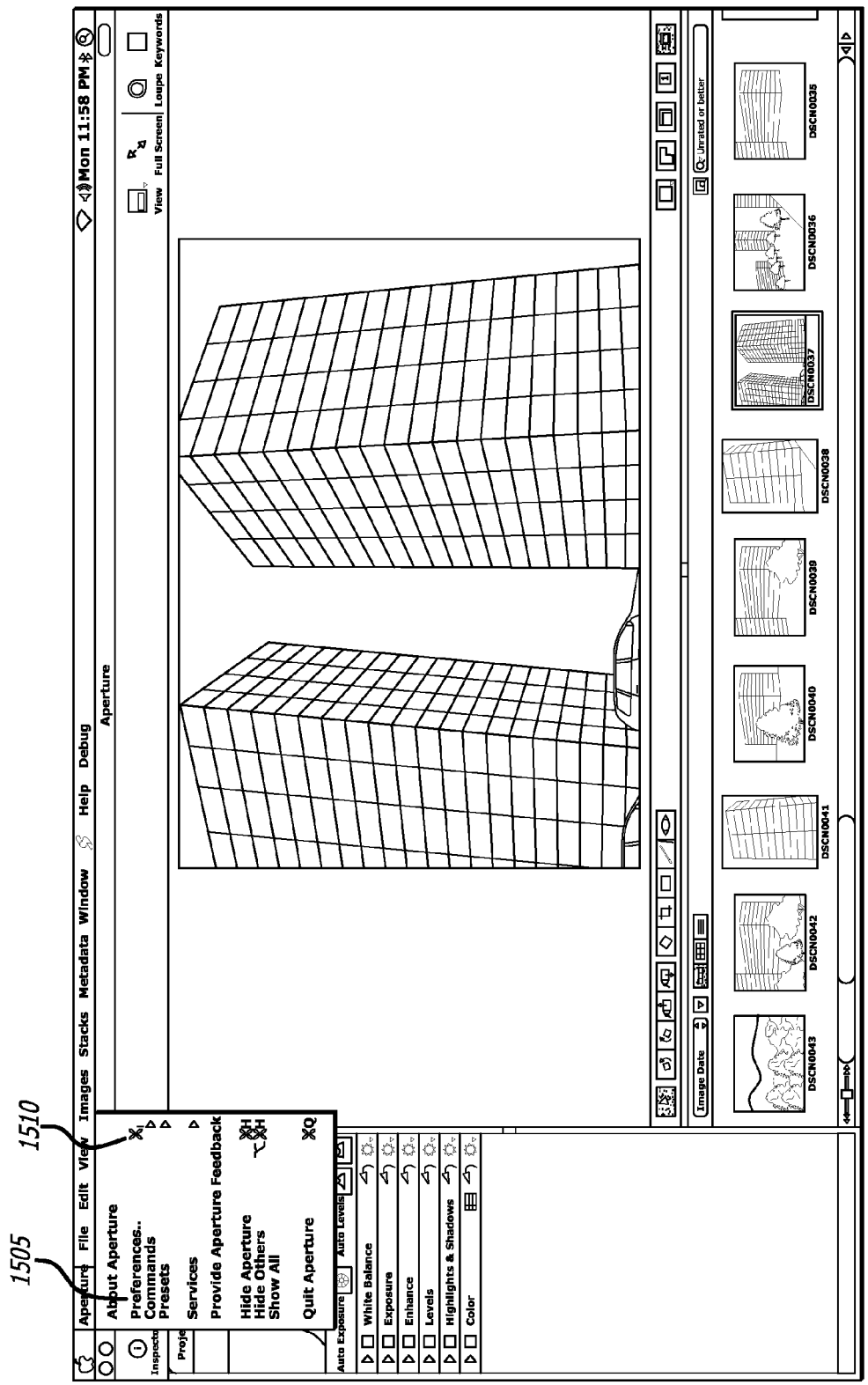
FIG. 15 illustrates an image-editing application that provides options to select a set of preferences in some embodiments.

Some embodiments provide tools that allow a user to enable or disable generation of preview images, and to specify and modify the resolution of the quick preview images. FIG. 15 illustrates the image-editing application of some embodiments. As shown, a menu option 1505 as well a short cut key 1510 are provided to select a set of preferences.

Figure 16:
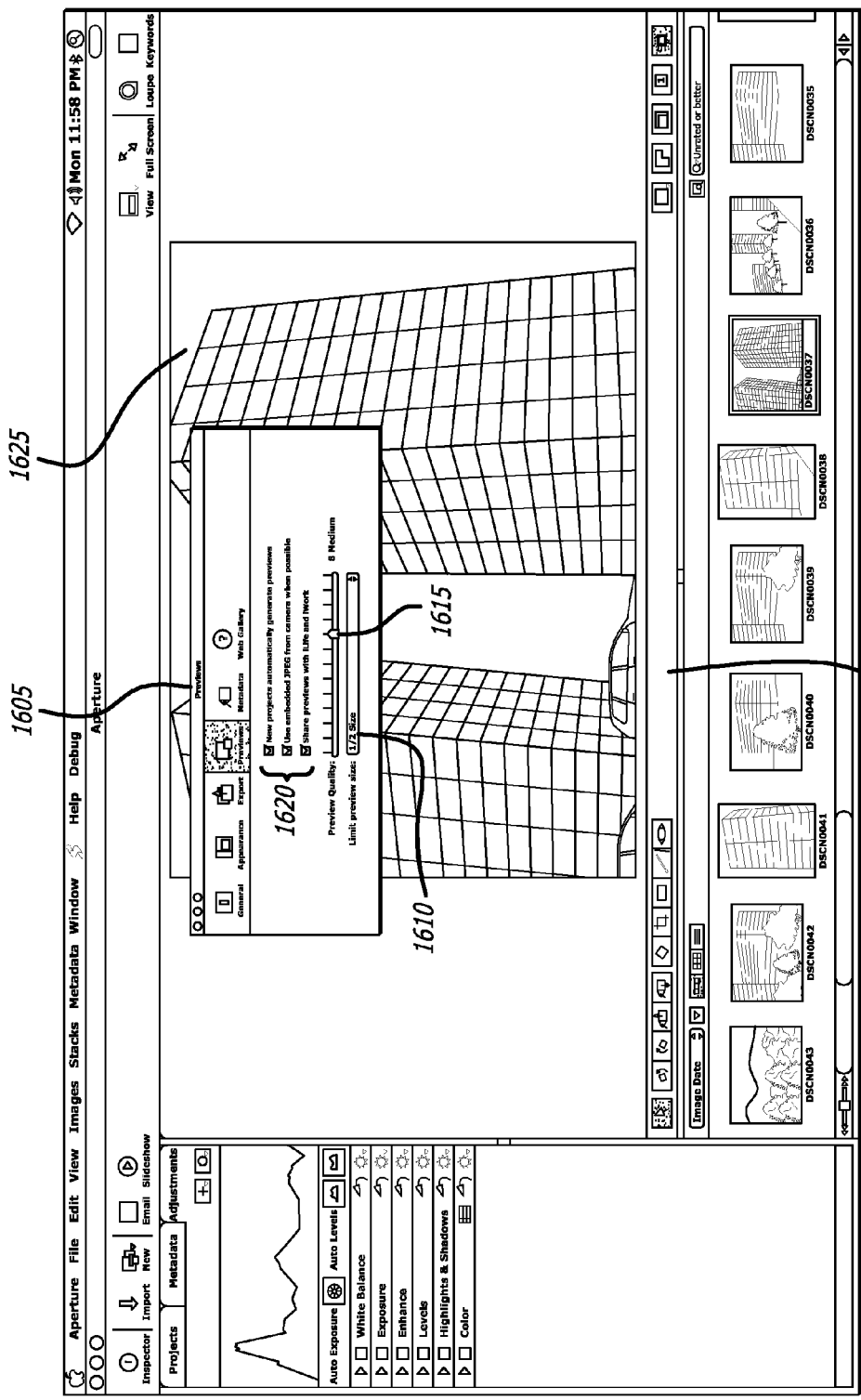
FIG. 16 illustrates a set of preferences provided for previews in some embodiments.
Figure 17:
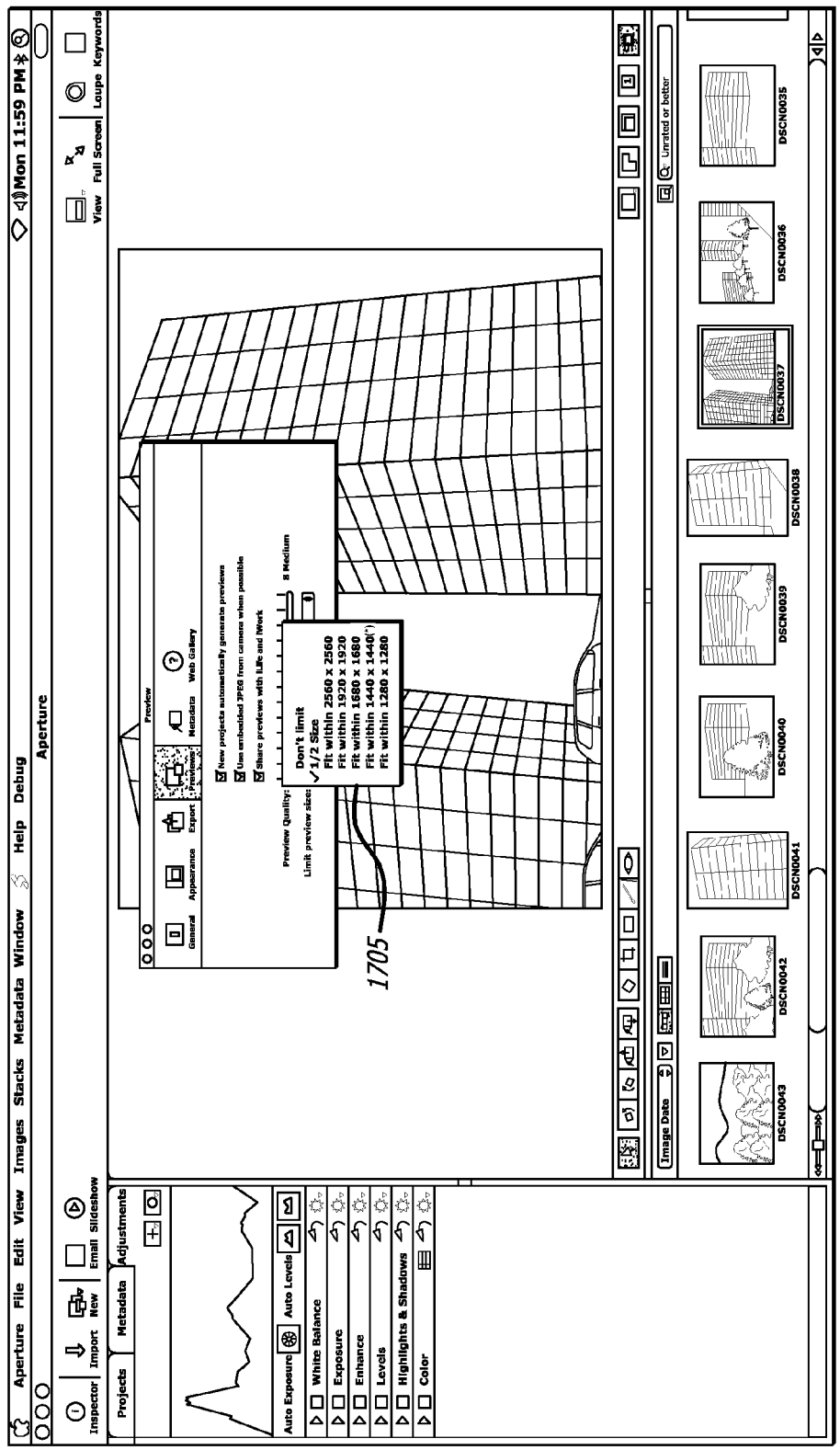
FIG. 17 illustrates examples of several options that are provided for the resolution (or size) of the preview images in some embodiments.

FIG. 16 illustrates several preferences 1605 that some embodiments provide to allow a user to enable or disable preview image generation and to specify size of the preview image. A user can select a limit 1610 for the resolution (or size) of the preview images. FIG. 17 illustrates examples of several options 1705 that are provided for the resolution (or size) of the preview images in some embodiments. As an example, the quick preview tool of some embodiments provides the following different sizes for a quick preview image: 1280 pixels, 1440 pixels, 1680 pixels, 1920 pixels, 2560 pixels, half the dimensional size of the master image, and no limit (i.e., the size of the master image). In some embodiments when the master image is generated from a raw file and the quick preview image is generated in JPEG format, the size of the quick preview image might become larger than the size of the master image. For instance, in some embodiments this happens because the master image is generated from the raw image based on raw (RAW) processing requirements and the JPEG quick preview is generated to have a multiple of eight rows. Under these conditions, the actual size of the quick preview image for certain images might become larger than the size of the master image when the user selects no limit for the quick preview image size.

Figure 18:
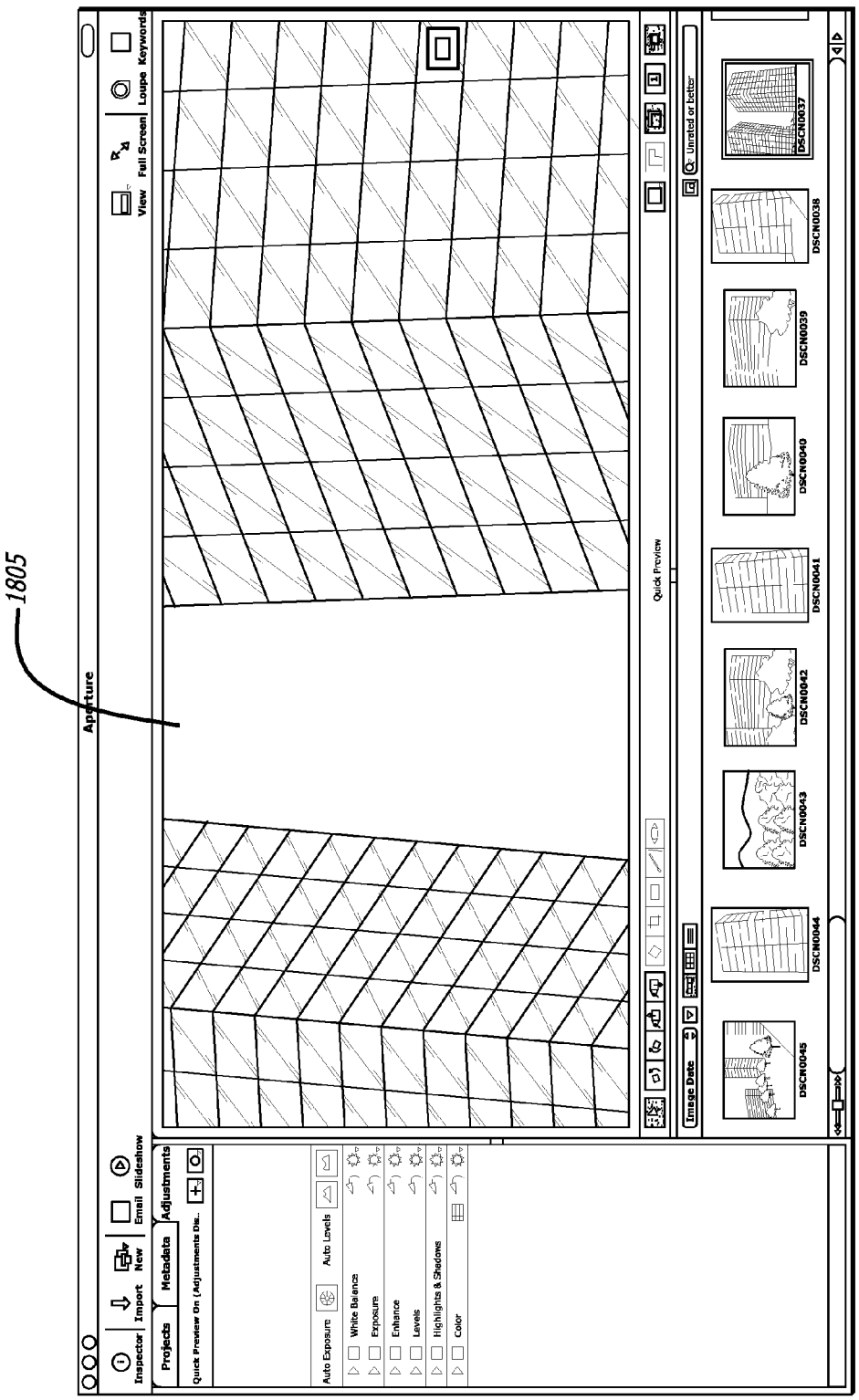
FIG. 18 illustrates an image displayed at full size when quick preview is active in some embodiments.
Figure 19:
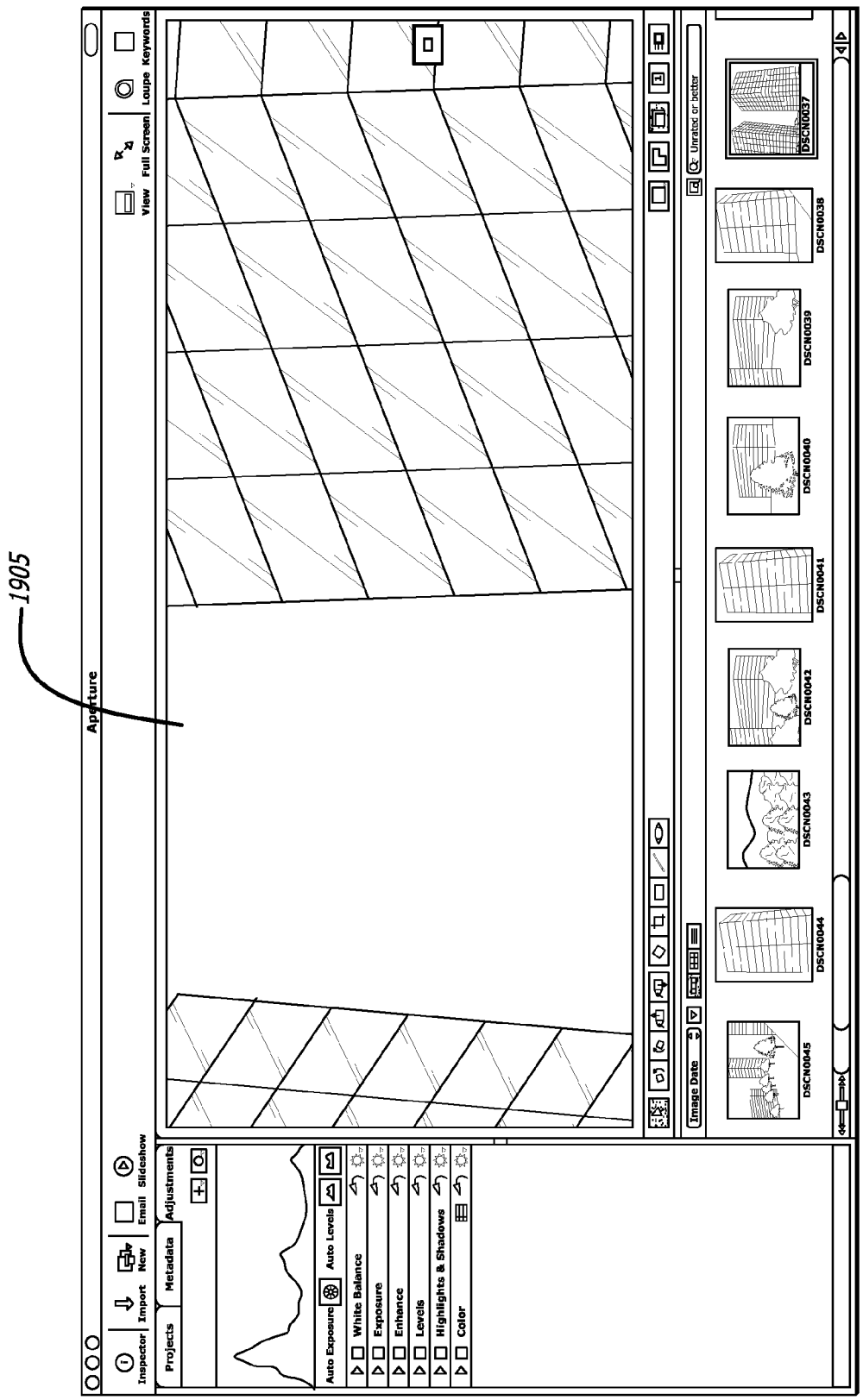
FIG. 19 illustrates an image displayed at full size when quick preview is not active in some embodiments.

Selecting a size option other than no limit for the quick preview image may cause the quick preview and the master image to be of different sizes. The displayed image 1625 in FIG. 16 is reduced to fit the viewing area 115. FIG. 18 illustrates the same image 1805 at full size with quick preview turned on. This quick preview image is generated with the option to set the quick preview size to half the size of the master image. FIG. 19 illustrates the master image 1905 when the quick preview is turned off. As shown, the size of the image 1805 displayed when quick preview is on is smaller than the size of the corresponding master image 1905.

As further shown in FIG. 16, a control 1615 is provided to select a compression quality for the preview images. When a compressed file (e.g., a JPEG format image) is generated, the compression quality can be set to maximum to generate larger and sharper image or can be set to lower quality levels to generate images with more artifacts in them but with smaller files.

FIG. 16 also illustrates that some embodiments provide several other options 1620 that allow a user to specify (1) whether preview images shall be generated for new projects, (2) whether embedded JPEG images from an importing device (e.g., a camera, a hard drive, memory card, etc.) shall be used for display when available, and (3) whether the previews shall be shared with other applications. Also, some embodiments provide the option for a user to turn generation of quick preview images on or off for an existing project. In these embodiments, for the duration that the generation of quick preview images is inhibited, no quick preview images are generated.

L. Loupe

Figure 20:
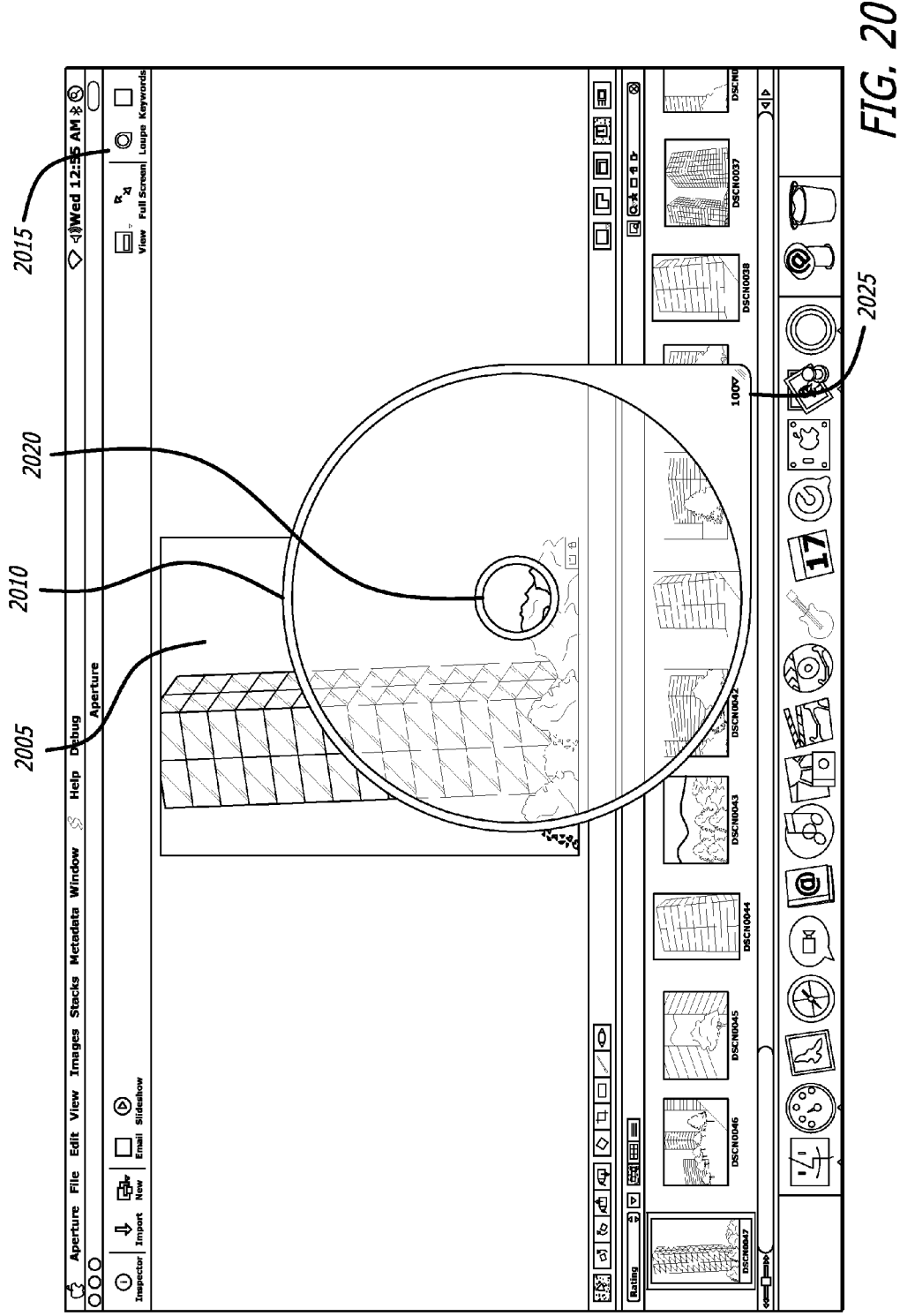
FIG. 20 illustrates a loupe tool and a master image scaled to fit the size of the display area in some embodiments.

The quick preview operation also affects the operations of a loupe tool in some embodiments. The loupe tool is a scaling tool (or a magnifier) that is used to scale up or down portions of an image. FIG. 20 illustrates a master image 2005 that is scaled to fit the size of the image display area in some embodiments. FIG. 20 also shows a loupe tool 2010. This loupe can be activated, for instance, by clicking on an icon 2015. The loupe provides a center circle 2020 to select an area on the image 2005 to be magnified. The loupe also can be adjusted for different magnification sizes in relation to the master image. For instance, as shown by the visual cue 2025, the loupe 2010 is set to magnify the selected area 2020 to 100% of the size of the same area in the master image.

Figure 21:
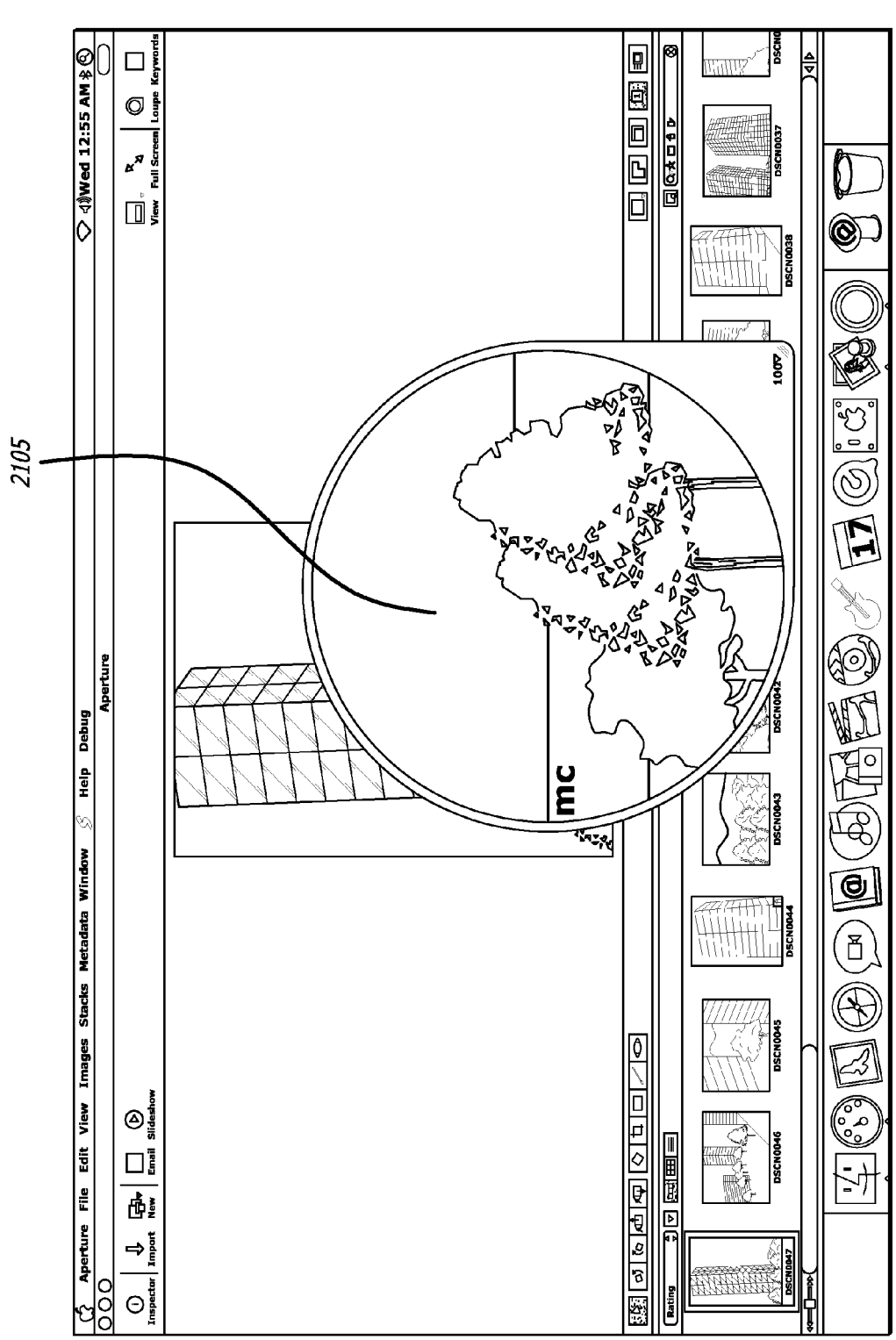
FIG. 21 illustrates a selected area of the image in FIG. 20 displayed to 100% the size of the same area of a full size master image.
Figure 22:
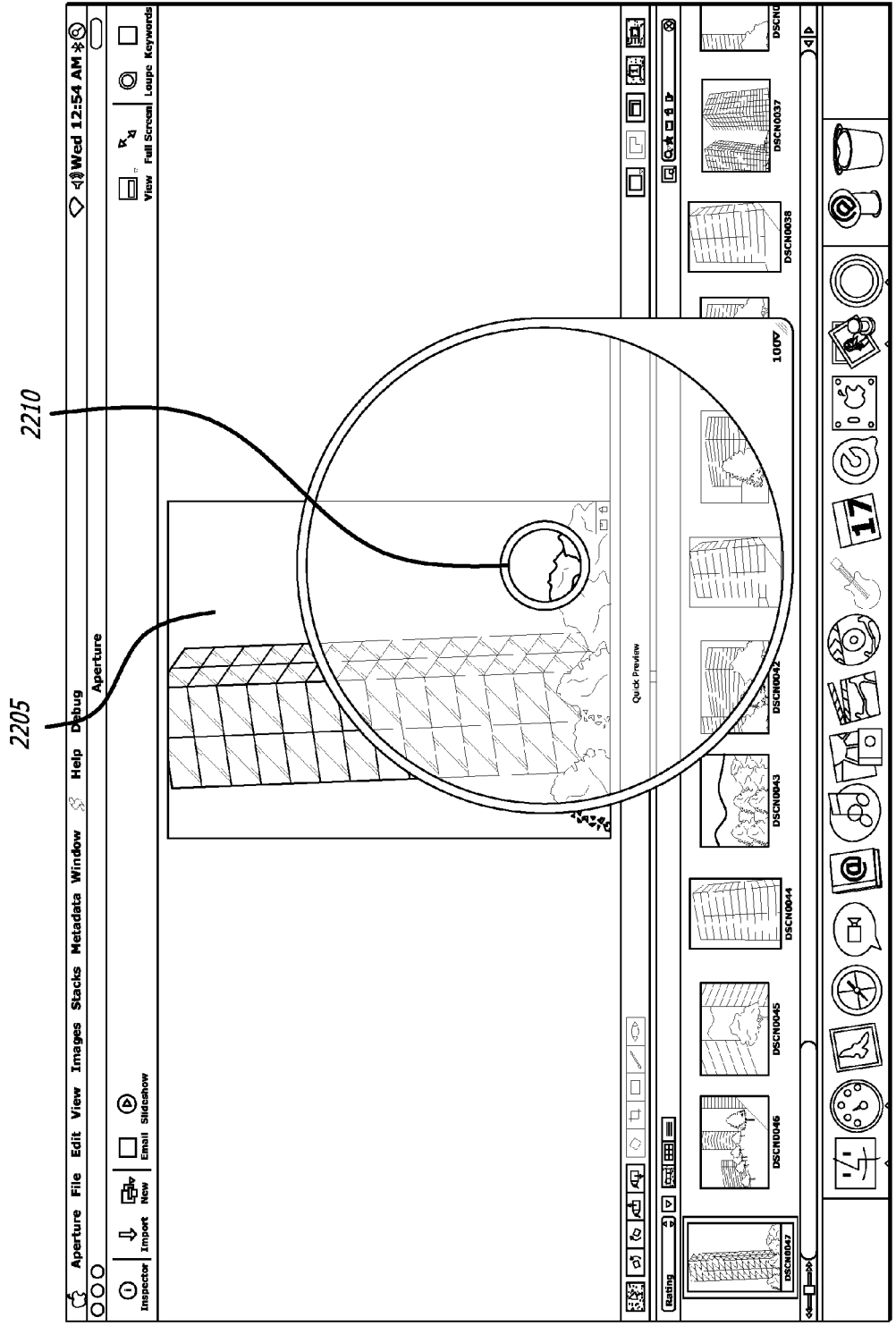
FIG. 22 illustrates a loupe tool and a scaled to fit image with quick preview activated in some embodiments.
Figure 23:
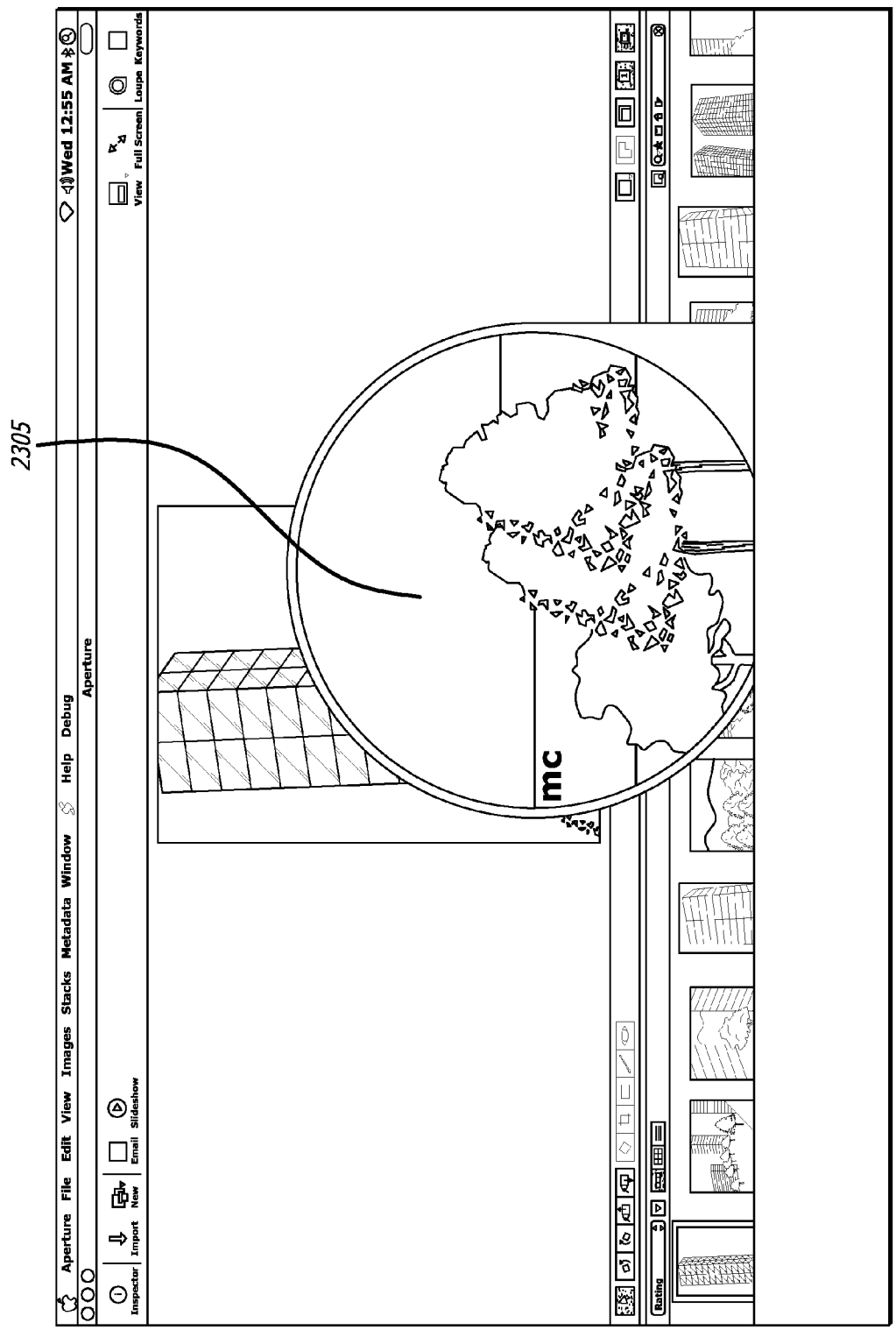
FIG. 23 illustrates the magnified area of the image of FIG. 22 in some embodiments.

FIG. 21 illustrates the selected area 2105 of the image displayed to 100% the size of the same area of the full size master image. FIG. 22 illustrates a scaled to fit image 2205 with quick preview activated in some embodiments. As shown, the same area 2210 of the image as in FIG. 20 is selected for magnification. FIG. 23 illustrates the magnified area 2305 of the image.

Different embodiments provide different options for displaying the loupe's enlarged area. Some embodiments display the enlarged area as it corresponds to the quick preview image whenever the quick preview image is available, while other embodiments always display the enlarged area as it corresponds to the master image. Some other embodiments display the enlarged area using the quick preview image when the quick preview is on and display the enlarged area using the master image when the quick preview is off. Some embodiments provide options to selectively choose some or all of the above mentioned options to display the enlarged area. Also, some embodiments provide options to set the loupe to scale to a percentage of either the master image or the quick preview image. In some embodiments, when the area enlarged by the loupe corresponds to the master image, a user can edit that area of the master image even when the quick preview is enabled.

Figure 24:
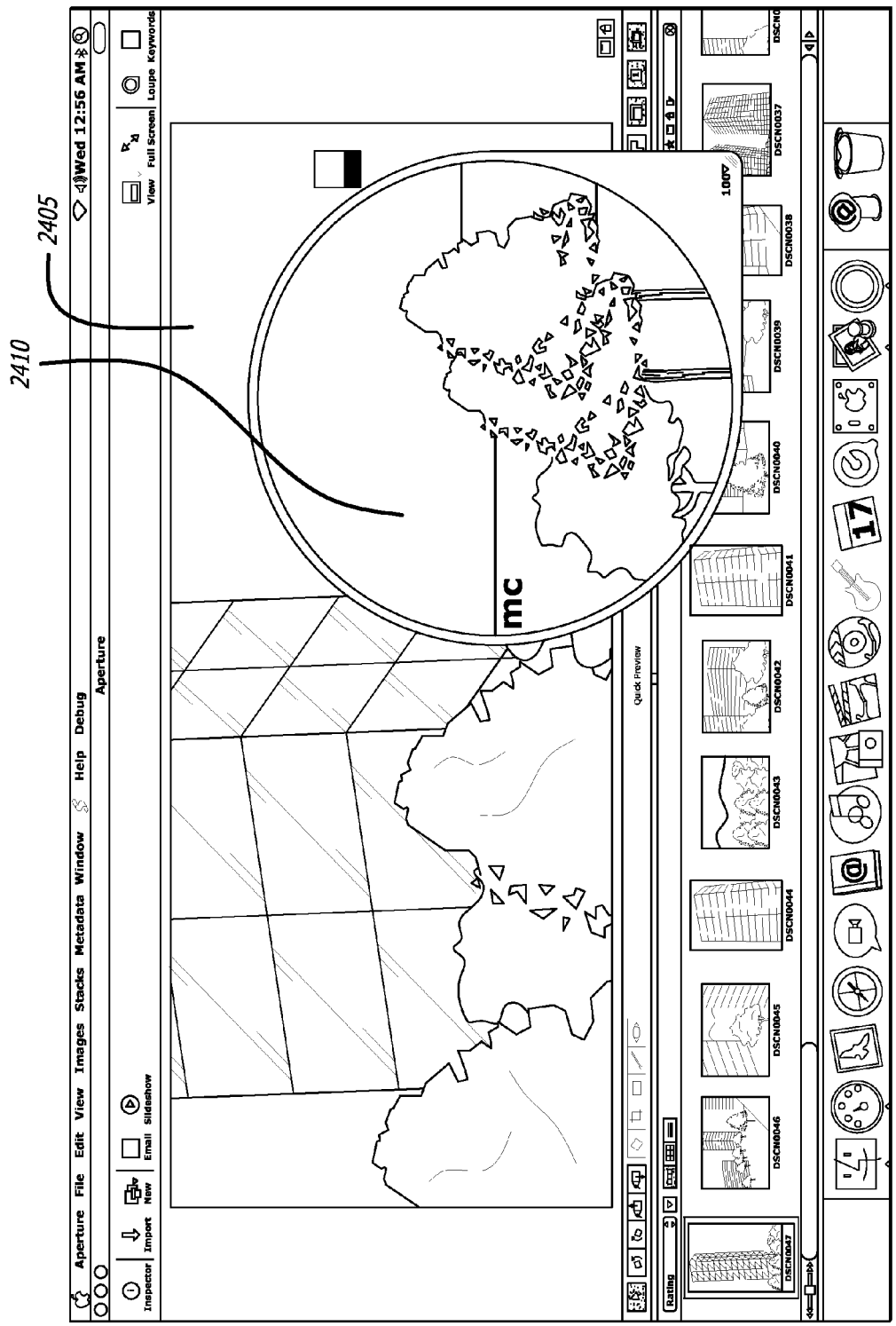
FIG. 24 illustrates an image displayed in full size with quick preview activated in some embodiments.
Figure 25:
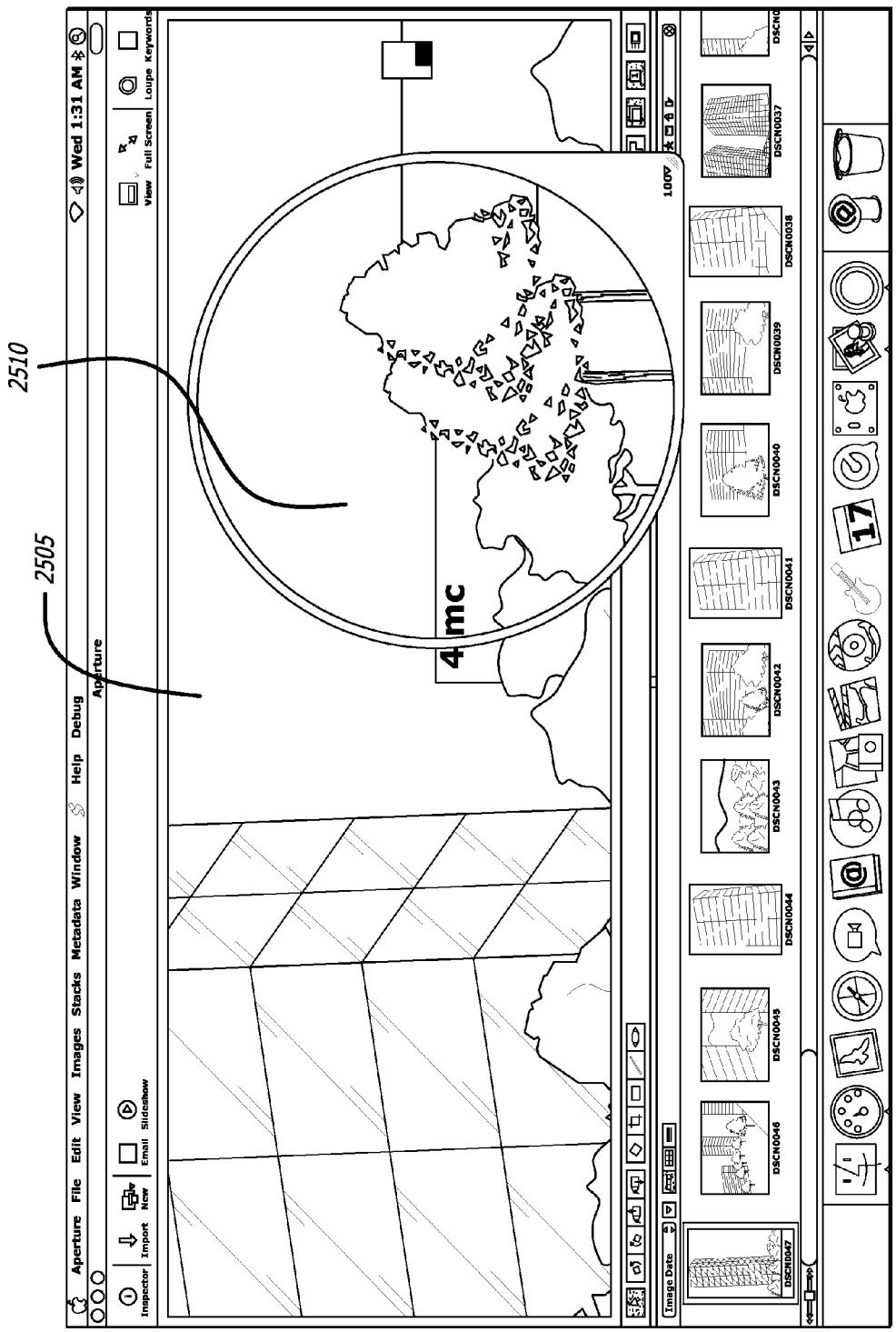
FIG. 25 illustrates an image displayed in full size with quick preview not activated in some embodiments.

Also, FIGS. 24 and 25 illustrate the same image displayed in full size with the quick preview turned on and off respectively. In this example, the loupe is set to enlarge the selected area of the image to 100% of the master image no matter whether the quick preview image or the master image is currently displayed. As shown, the preview image 2405 is smaller than the master image 2505. However, since the loupe is set to 100% of the master image, the magnified areas 2410 and 2510 of the two images are the same size. Furthermore, these magnified areas 2410 and 2510 are the same size as the magnified areas 2105 and 2305 of FIGS. 21 and 23 respectively. Therefore, in some embodiments, no matter whether the displayed image is full size or scaled to fit and no matter whether the quick preview is on or off, the loupe magnifies the selected area of the image to the same size.

Figure 26:
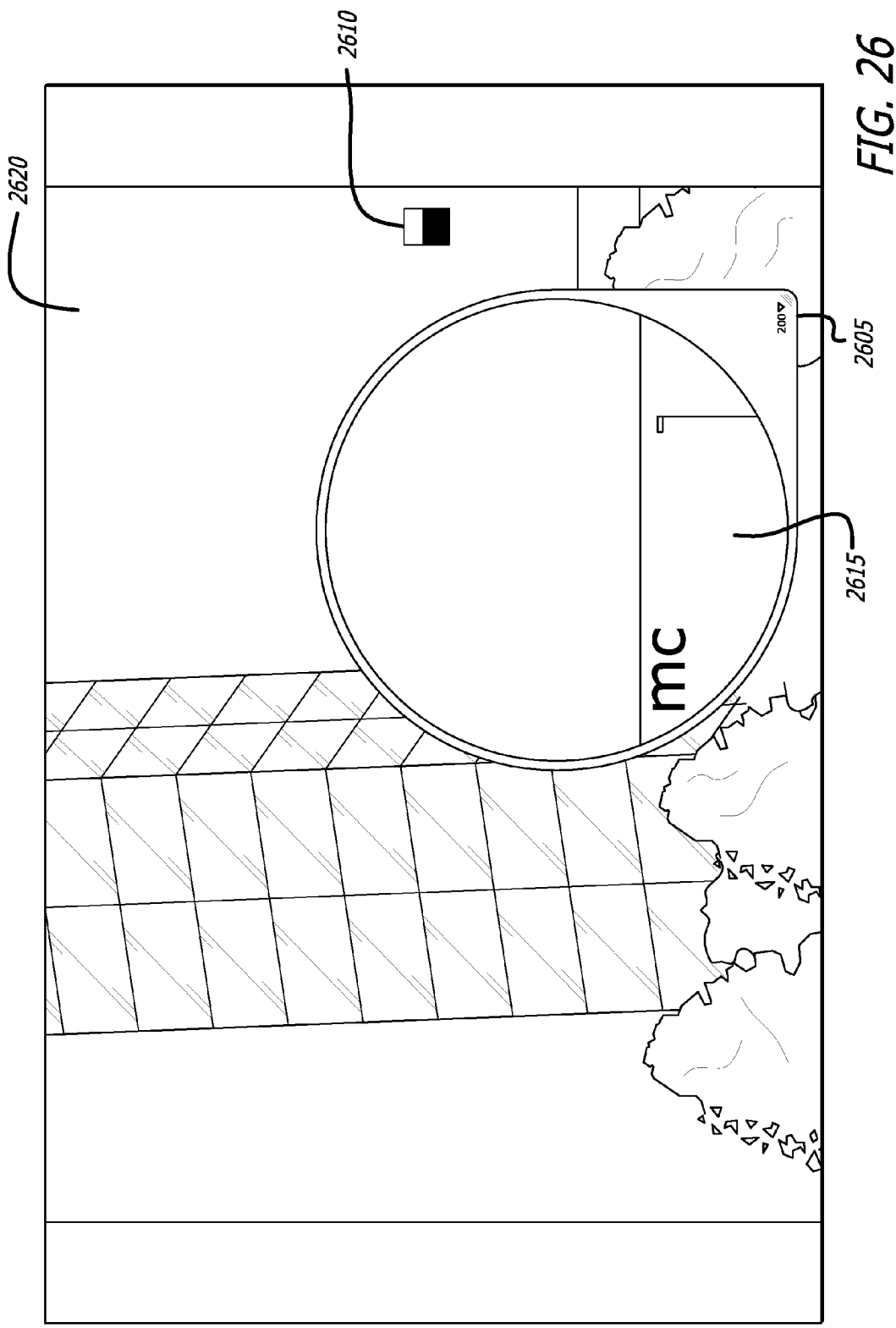
FIG. 26 illustrates a loupe that is set to enlarge to 200% of the mater size in some embodiments.

Also, the loupe can be set to scale the image to percentages other than 100% of the size of master (or quick preview) images. FIG. 26 illustrates a loupe that is set to enlarge to 200% (as shown by visual cue 2605) of the mater size in some embodiments. The image 2620 is a master image and is displayed in full screen to actual size. As indicated by the visual cue 2610, only a portion of the actual size image fits in the full size screen. As shown, the loupe has enlarged the selected area 2615 to 200% of the master image size. Similarly, the loupe can be set to scale the selected area to less than 100% of the master (or quick preview) image size.

IV. Quick Preview Processes

The preceding section illustrated the features of the quick preview tool in an image editing application of some embodiments. This section describes the quick preview processes of some embodiments of the invention.

A. Performing Quick Preview

Figure 27:
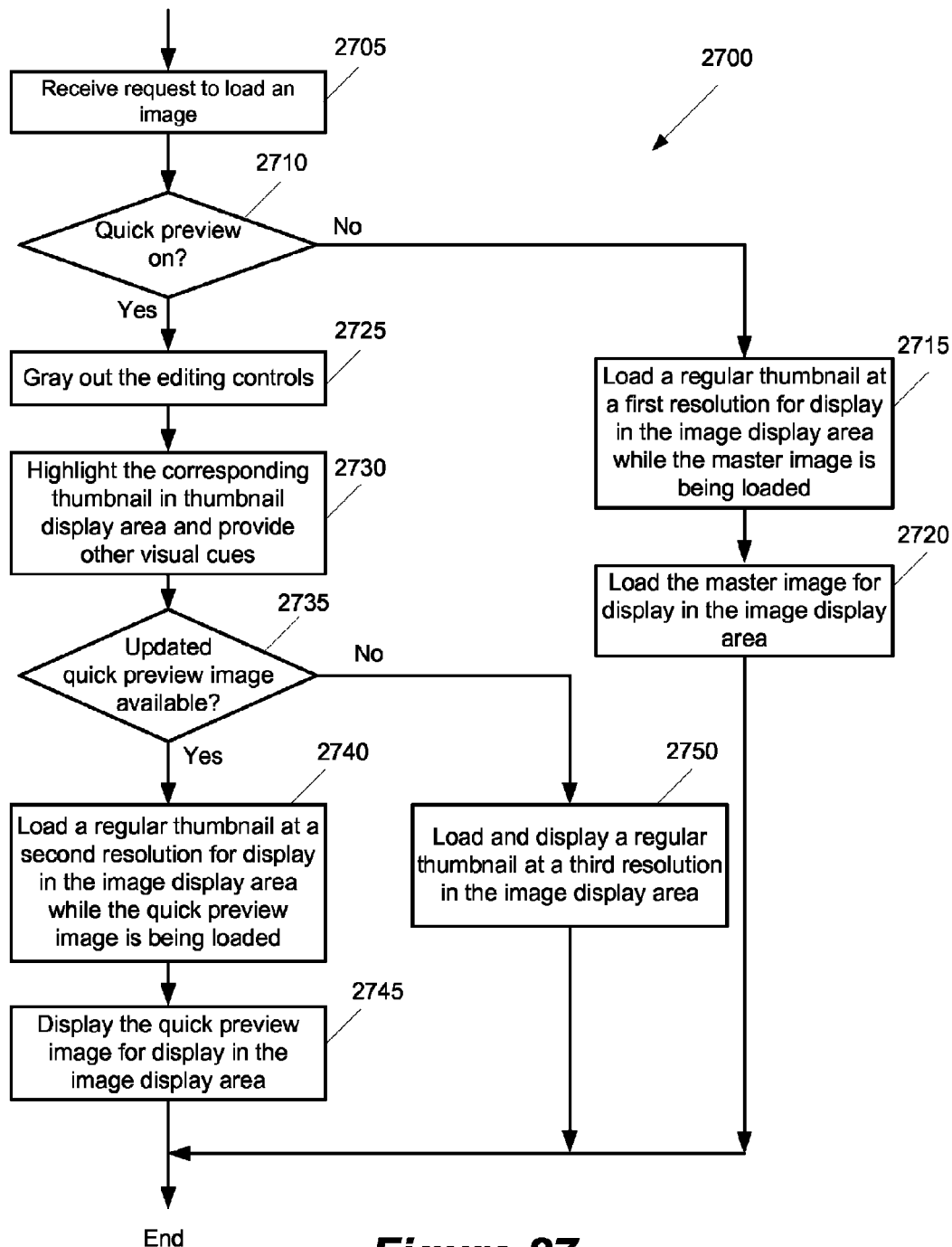
FIG. 27 conceptually illustrates a process for performing quick preview in some embodiments.

FIG. 27 conceptually illustrates a process 2700 for performing quick preview in some embodiments. As shown, the process receives (at 2705) a request to load an image for display in the image display area. For instance, such a request can be received when a user selects a thumbnail image in the thumbnail display area of the image editing application of FIG. 1. The process determines (at 2710) whether quick preview is enabled. When the quick preview is not enabled, the process in some embodiments loads and displays (at 2715) a regular thumbnail image at a first resolution. This thumbnail is displayed in the image display area while the master image is being loaded. For instance, in some embodiments, this thumbnail image may have a resolution of 32 pixels, 256 pixels, or 1024 pixels. Next, at 2720 the process loads and displays the master image in the image display area. The process then ends.

On the other hand, when the process determines (at 2710) that the quick preview is enabled, the process (at 2725) disables editing tools and grays out the editing controls on the display. Because the image editing application of some embodiments does not allow a user to specify image modifications when viewing preview images in the display area, the editing application of some of these embodiments makes the editing tools not accessible to a user when the quick preview tool has been selected. This also provides notification to the user that the quick preview tool has been selected.

In conjunction with this notification, the image editing application of some embodiments provides other indications of the selection of the quick preview tool. Accordingly, the process provides (at 2730) these other notifications. For instance, in some embodiments, the process highlights (at 2730) a thumbnail of the image in the thumbnail display area (if the thumbnail area is displayed) with a distinct color to indicate the quick preview is enabled. In addition to highlighting the thumbnail, the process provides other visual cues, such as placing a mark (e.g., a "Quick Preview" mark) on the display area, placing a mark (e.g., a "P") on the image, etc.

Next, the process determines (at 2735) whether an updated quick preview image is available. When an updated quick preview image is available, the process (at 2740) loads and displays a regular thumbnail image at a second resolution while the quick preview image is being loaded for display. This thumbnail image has the same resolution as the thumbnail image loaded in step 2715 in some embodiments, while in other embodiments the two thumbnail images have different resolutions. After the quick preview image is loaded, the process displays (at 2745) the quick preview image in the image display area. The process then ends. On the other hand, if an updated quick preview image is not available (e.g., generation of quick preview images was suppressed when the image was imported or last edited) then the process (at 2750) loads and displays a regular thumbnail at a third resolution. This thumbnail image has the same resolution as the thumbnail images loaded in steps 2715 and 2740 in some embodiments, while in other embodiments the thumbnail images have different resolutions. The process then ends.

B. Generation of Quick Preview Image

Different embodiments generate the quick preview image differently. In some embodiments, the image editing application generates the quick preview image in the background a time interval after an editing operation is performed. Some embodiments generate the quick preview image when a master image is rendered and there is no up-to-date quick preview image. Some embodiments also generate a quick preview image when an image is imported or when a new project is generated. Also, some embodiments provide an option for a user to turn generation of quick preview images on or off. In these embodiments, for the duration that the generation of quick preview images is inhibited, no quick preview images are generated. These embodiments are described further below.

1. Generation of Quick Preview Immediately after an Editing Operation is Performed Some embodiments generate a quick preview image a time interval after an editing operation is performed. In these embodiments, once a quick preview is generated for an image, the quick preview image is saved and is not updated until the master image is edited again.

Figure 28:
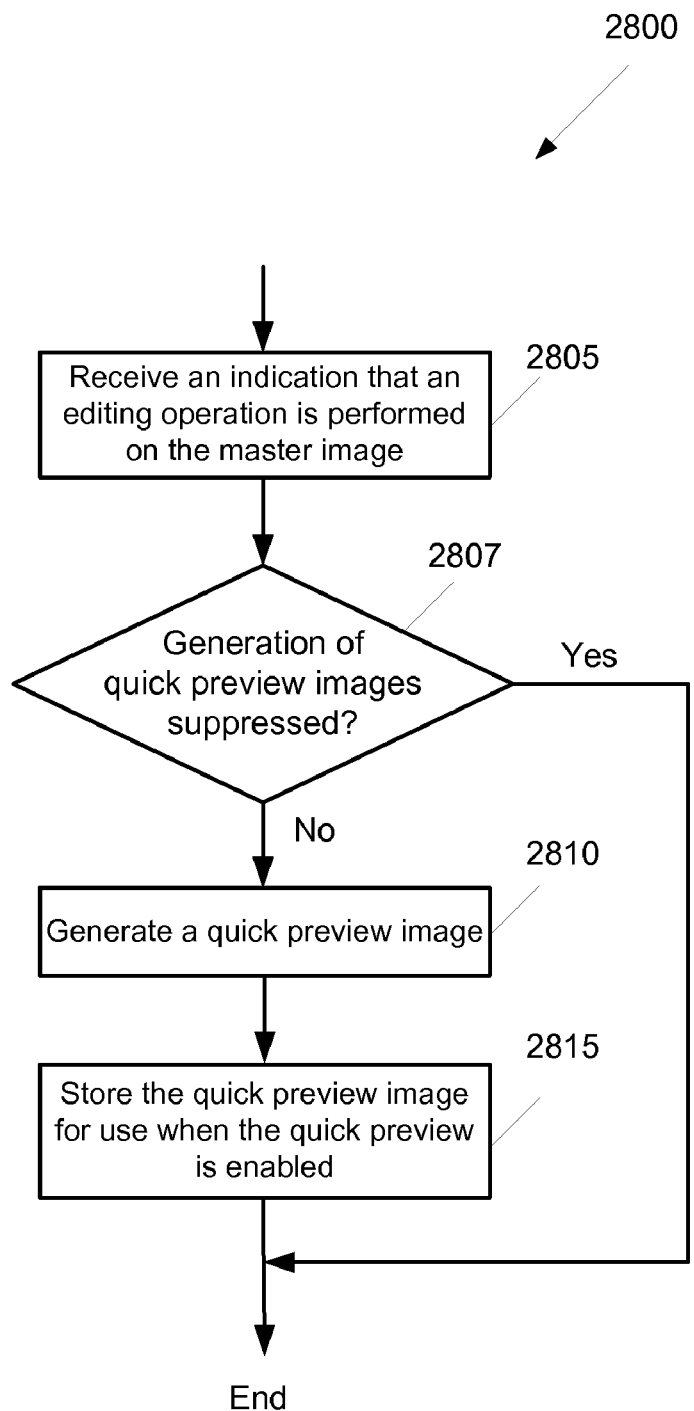
FIG. 28 conceptually illustrates a process for generating the quick preview after the master image is edited in some embodiments.

FIG. 28 conceptually illustrates a process 2800 for generating quick preview images in some embodiments. As shown, the process receives an indication that editing operation is performed on the master image. Next, the process determines (at 2807) whether generation of quick preview images is suppressed. When the generation of quick preview images is suppressed, the process ends. On the other hand, the process generates (at 2810) a quick preview image.

In some embodiments, the quick preview image is generated in the background a predetermined amount of time after an editing operation is performed. For instance, a user might select a cropping tool and drag it across an image. When the user continues using the same tool or another editing tool within the predetermined time interval, no quick preview is generated. On the other hand, when the user does not use the same or another editing tool after the predetermined time, a quick preview image is generated. After the quick preview is generated, if the user continues to use editing tool, the quick preview is updated whenever there is no editing activity within the predetermined time interval. Also, instead of using the predetermined time interval to generate the quick preview image, some embodiments wait until all editing operations are done (e.g., when a non-editing tool is selected) before generating the quick preview image. Next, the process stores (at 2815) the quick preview image for use when the quick preview is enabled. The process then ends.

2. Generation of Quick Preview Image when a Master Image is Rendered

Figure 29:
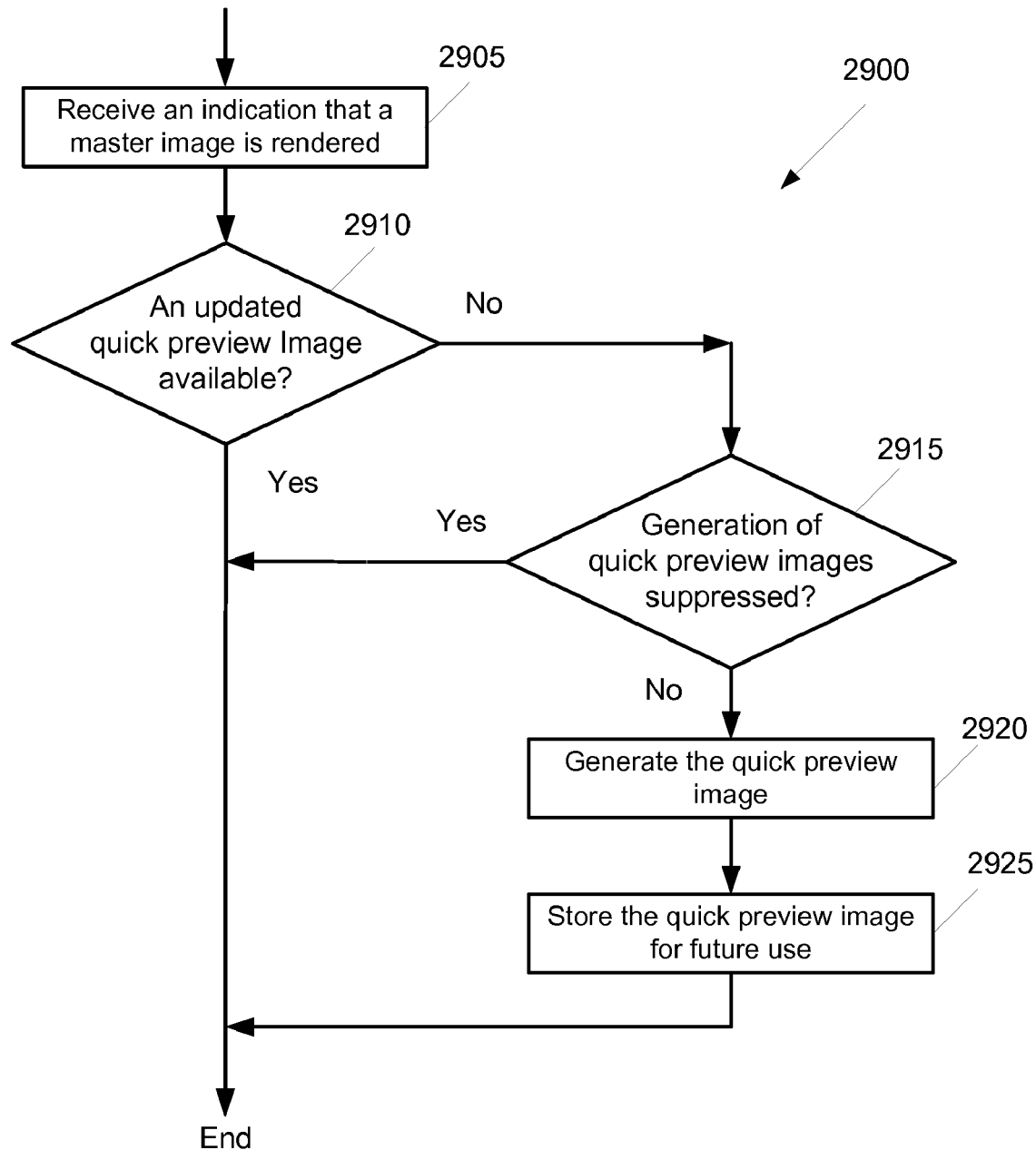
FIG. 29 conceptually illustrates a process for generating the quick preview in some embodiments.

Whenever an up-to-date quick preview is not available and a master image is displayed, some embodiments generate a new updated quick preview image from the master image. FIG. 29 conceptually illustrates a process 2900 for generating the quick preview image in these embodiments. As shown, the process receives (at 2905) an indication that a master image has been rendered. For instance, this might happen when the quick preview is off and an image is selected for display. The process determines (at 2910) whether an updated quick preview image is available. If an updated quick preview image with all current adjustments exists, the process ends. Otherwise, the process determines (at 2915) whether the generation of quick preview images is suppressed. When the generation of the quick preview images is suppressed, the process ends. Otherwise, the process generates (at 2920) an updated quick preview image. Next, the process stores (at 2925) the quick preview image for future use when the quick preview is enabled. The process then ends.

3. Generation of Quick Preview while Importing Images

Figure 32:
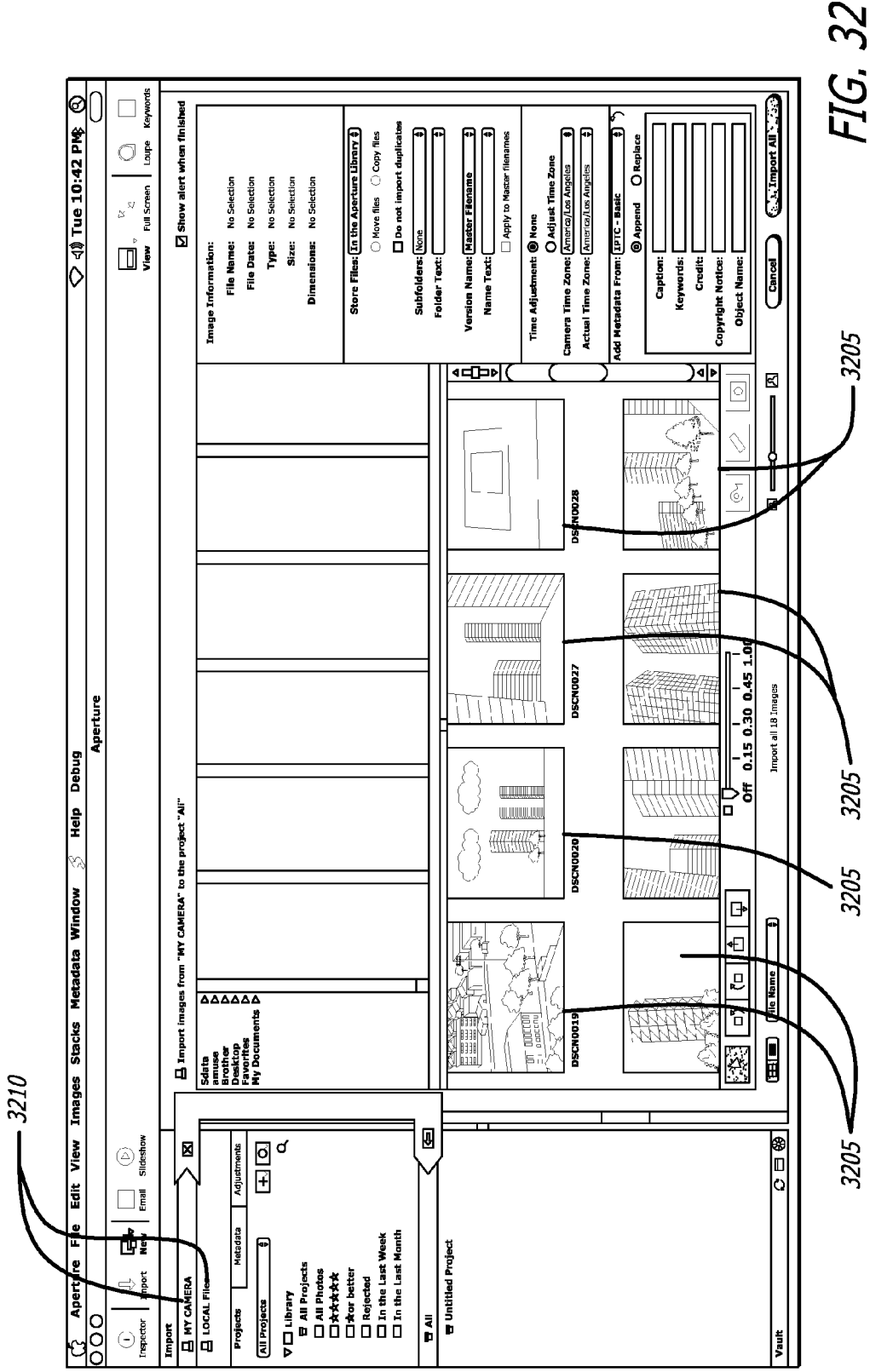
FIG. 32 conceptually illustrates an image importing tool of some embodiments.

Some embodiments provide an image importing tool for importing images into one of the databases of the image editing application. FIG. 32 illustrates the importing tool of some embodiments. As shown, the tool allows importing images 3205 from one or more devices 3210. These importing source devices might be devices such as cameras, memory cards, hard drives, image scanners, etc. Furthermore, as described in Section III above, some embodiments provide options to generate quick preview images while importing images into the image-editing application or when creating a new image-editing project.

Figure 30:
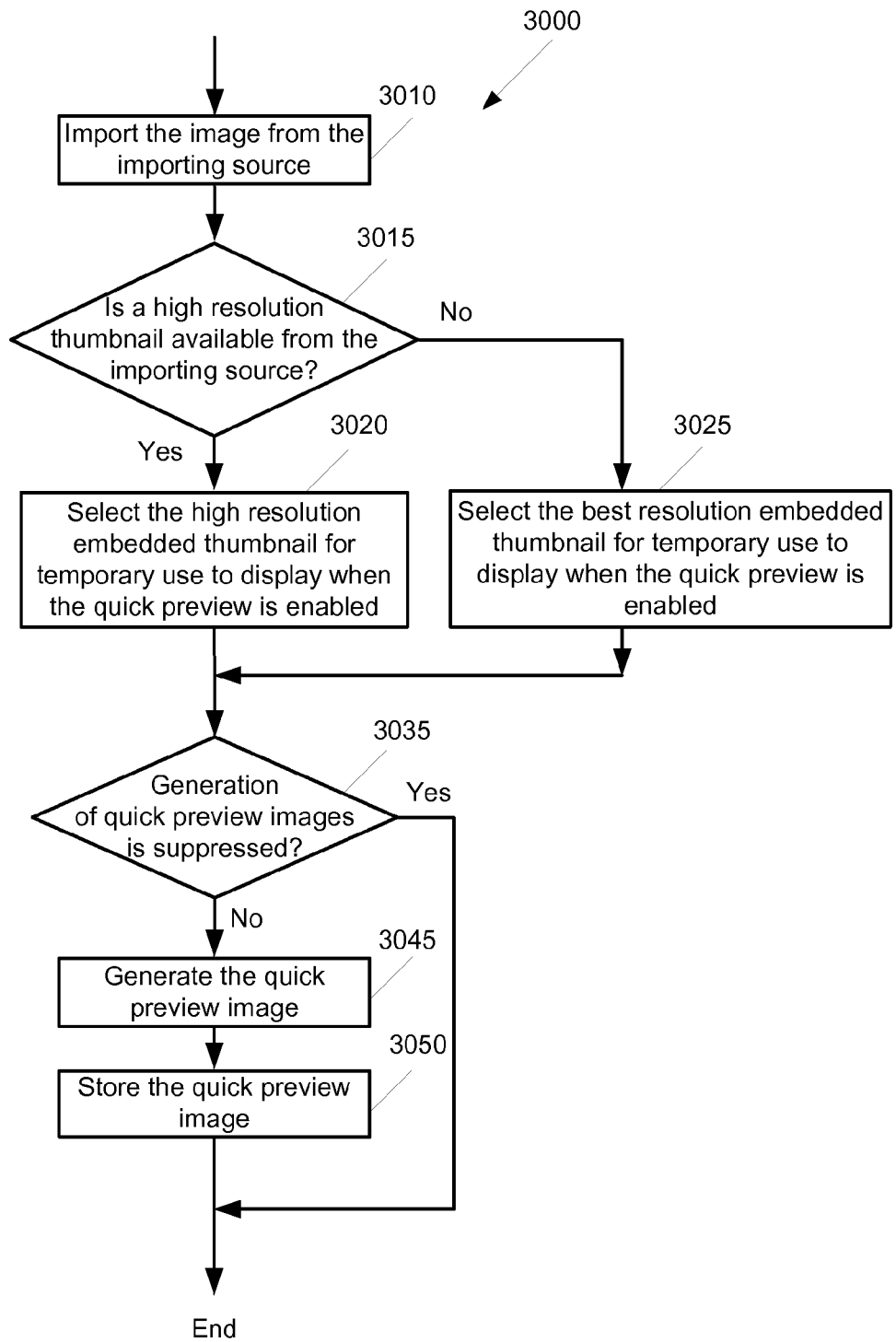
FIG. 30 conceptually illustrates a process that is used to import an image into the image-editing application of some embodiments.

FIG. 30 conceptually illustrates a process 3000 that is used to import an image into an image database of the image-editing application of some embodiments. As shown, the process imports (at 3010) the image from the importing source. Next, the process determines (at 3015) whether a high resolution thumbnail for the imported image is available from the importing source. When a high resolution thumbnail is available, the process selects (at 3020) this high resolution thumbnail for temporary use to display when the quick preview is enabled. Such a high resolution embedded image is, e.g., available from many cameras. When later on, the quick preview is enabled and the image being imported is selected for display, some embodiments use this thumbnail for display when no quick preview image is available for the image. When no high resolution images are available, the process selects (at 3025) the best resolution thumbnail that is available for the device for temporary use to display when the quick preview is enabled.

At 3035, the process determines whether generation of quick preview images is suppressed. For instance, as described in the previous sections, some embodiments provide an option for a user to selectively suppress generation of quick preview images. A user might select such a preference when the user wishes to speed up the importing process. When the generation of quick preview images is suppressed, the process ends. When the generation of quick preview images is not suppressed, the process generates (at 3045) a quick preview image. Next, the process stores (at 3050) the quick preview image for further use. The process then ends.

Process 3000 is a conceptual process. Although steps 3010-3050 are shown to be performed by one process, to import a number of images some embodiments employ a set of one or more processes to import the images (step 3010) while employing another set of one or more processes for thumbnail selection (steps 3015-3025) and quick preview image generation (steps 3035-3050). Accordingly, image import, thumbnail selection, and quick preview generation might be performed (as shown in FIG. 30) for each image prior to image import, thumbnail selection, and quick preview generation for the next image. Alternatively, one or more of these processes might be performed for some or all images before performing the other processes for the rest of the images. Also, some embodiments perform image import, thumbnail selection, and/or quick preview generation in batch mode for some or all images.

Although the above process was described with reference to importing images into the image-editing application, a person of ordinary skill in the art would realize that a similar process can be used to create new projects. For instance, in the case of a new project, the process might copy images from another project or library.

C. Generation of Quick Preview Images with Different Sizes

As described above, some embodiments allow the user to change the sizes for the quick preview image. Also some embodiments store quick preview images and do not update them until the master image is edited. As a result, some embodiments may have (1) different images with different sized quick preview images at any given time, and (2) the same image with different quick preview image sizes at different times.

Figure 31:
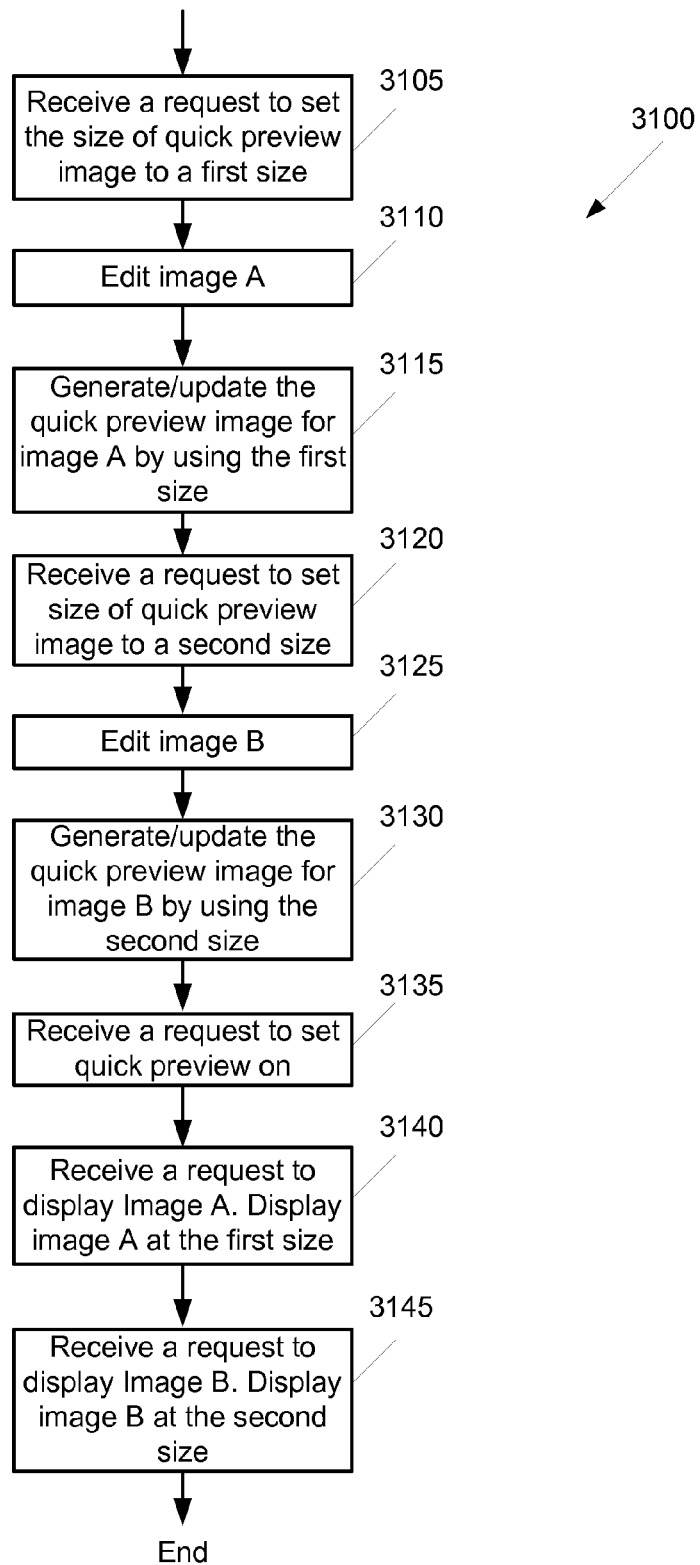
FIG. 31 illustrates an exemplary scenario where two different images might have corresponding quick preview image of different sizes in some embodiments.

FIG. 31 conceptually illustrates a process 3100 for changing the size of quick preview images in some embodiments. The process is described with reference to an exemplary scenario that results in two different images to have corresponding quick preview images with different sizes. As shown, the process receives (at 3105) a request to set the size of the quick preview images to a first size. For instance, the first size might be 1280 pixels. The process sets the default size of the quick preview images to the first size. Any subsequent quick preview image is generated by using the first size. Next, an image (e.g., image A) is edited (at 3110). After this image is edited, the quick preview tool generates or updates (at 3115) the quick preview image for image A. This quick preview image has the first size and is saved to be used to display image A when quick preview is activated.

Next, the process receives (at 3120) a request to set the quick preview image size to a second size. For instance, the second size might be 1920 pixels. Any subsequent quick preview image is generated by using the second size. Next, at 3125 another image, e.g., image B is edited. After this image is edited, at 3130 the quick preview image corresponding to image B is generated or updated. This quick preview image will have the second size and will be stored to be used when image B is later on displayed after quick preview is later on activated.

Next, a request is received (at 3135) to activate quick preview and the quick preview is activated. Subsequently, a request is received (at 3140) to display image A. Since image A has not been edited after the quick preview sizes was changed to the second size, the quick preview image corresponding to image A is still stored and is loaded and displayed with the first size (in this example, 1280 pixels). Next, a request is received (at 3145) to display image B. Since the quick preview of image B was generated with the second size, the quick preview of image B is displayed in the second size (in this example, 1920 pixels). As demonstrated by the exemplary scenario of FIG. 31, for the embodiments that do not update quick preview images until the corresponding master image is edited, different images can have quick preview images of different sizes.

D. Zoom

Figure 33:
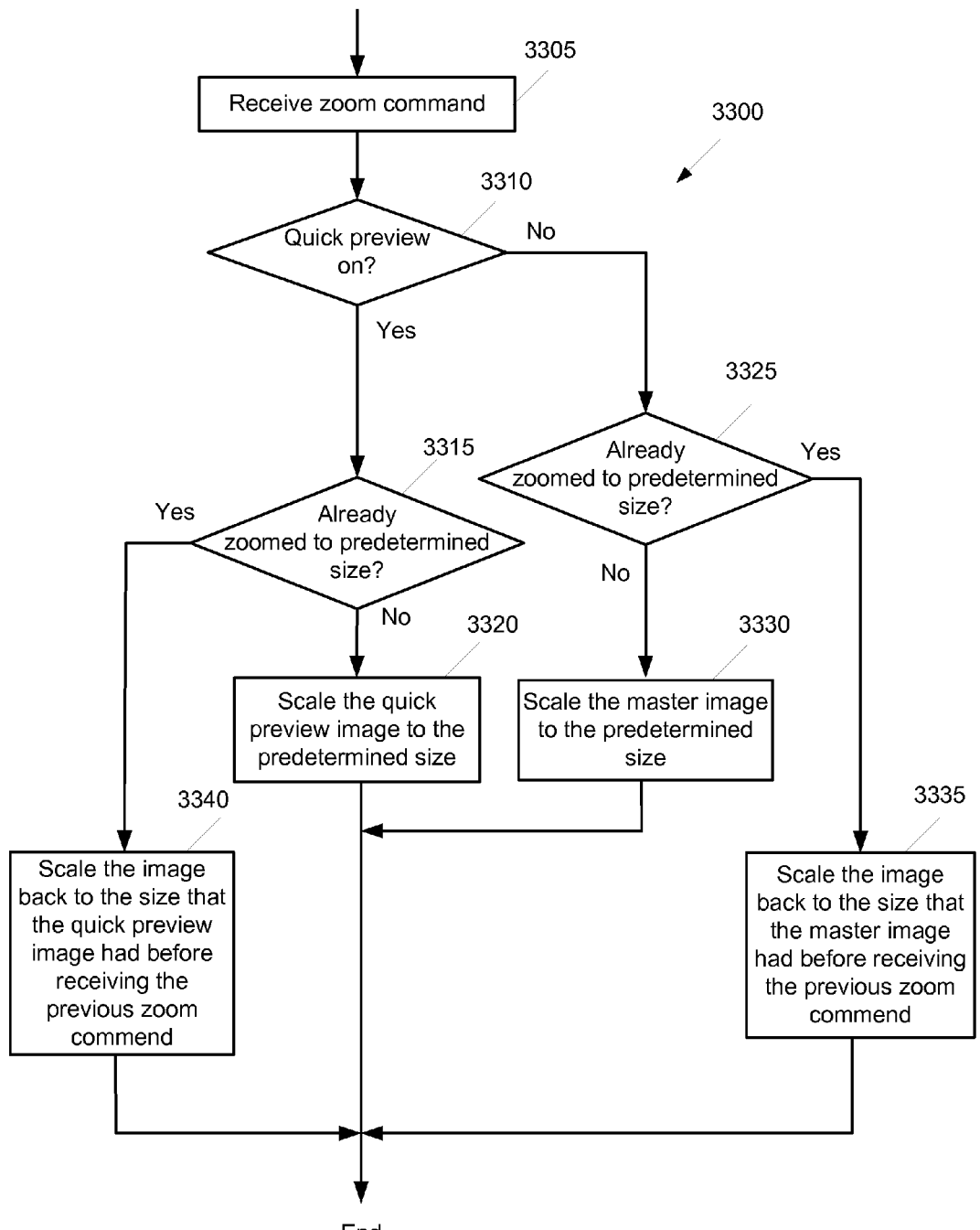
FIG. 33 illustrates a process for zooming a displayed image in some embodiments.

Some embodiments provide quick ways of changing the displayed size of an image by using a zoom tool. FIG. 33 conceptually illustrates a process 3300 for zooming a displayed image in some embodiments. As shown, the process receives (at 3305) a command to zoom an image displayed in the image display area. For instance this command might be a menu selection, click on an icon, hitting a short cut key (e.g., "Z"), etc. Next, the process determines (at 3310) whether the quick preview is on. When the process determines that the quick preview is on, the process proceeds to 3315 which is described below. On the other hand, when the process determines that the quick preview is not on, the process determines (at 3325) whether the image is already zoomed to a predetermined size of the master image. In some embodiments, the predetermined zoom size is user selectable. For instance, some embodiments provide several options for the user to set the zoom to a size that is 100%, less than 100%, or more than 100% of the maximum image size.

In some embodiments, when the image is already zoomed, the process exits (not shown). In some other embodiments, instead of exiting, the process toggles between the predetermined zoom size and the size that the image had prior to being scaled to the predetermined size (e.g., the scaled to fit size). In these embodiments, when the image is already zoomed and another command to zoom is received, the image is scaled back (at 3335) to the size that the image had prior to being zoomed to the predetermined size (i.e., prior to receiving the previous zoom command). When the process determines (at 3325) that the image is not already zoomed, the image is scaled to the predetermined size of the master image. The process then exits.

When the process determines (at 3310) that the quick preview is on, the process determines (at 3315) whether the image is already zoomed to a predetermined size of the quick preview image. In some embodiments, when the image is already zoomed, the process exits (not shown). In some other embodiments, instead of exiting, the process toggles between the predetermined zoom size and the size that the image had prior to being scaled to the predetermined size (e.g., the scaled to fit size). In these embodiments, when the image is already zoomed and another command to zoom is received, the image is scaled back (at 3340) to the size that the image had prior to being zoomed to the predetermined size (i.e., prior to receiving the previous zoom command). Yet, some other embodiments perform additional steps (not shown) between steps 3315 and 3340. In these embodiments, when the quick preview is enabled and the image is already zoomed to the predetermined size of the quick preview image, a subsequent zoom command would cause the image to be further zoomed to a predetermined size of the master image. Referring back to FIG. 33, when the process determines (at 3315) that the image is not already zoomed, the image is scaled to the predetermined size of the quick preview image. The process then exits. The use of zoom and the ability to switch between the quick preview and master images (e.g., as described in Section III.B) creates a workflow sequence for a user to quickly display details of an image. For instance, when quick preview is on and a scaled to fit image is displayed (e.g., as shown in FIG. 8), the user can use the zoom tool to zoom to full size of the quick preview. If the user wants to see more details, the user can turn quick preview off to see the image to the full size of the master image. The zoom process 2700 was described for zooming a master (or a quick preview) image by scaling the master image (or the quick preview image) to a desired percentage. However, similar to the loupe tool described in Section III.F above, the zoom process in some embodiments provides the option to scale a displayed master image to a quick preview image or to scale a quick preview image to a master image.

E. Automatic Exit from Quick Preview

While the editing application of some embodiments does not allow a user to perform image modifications when the quick preview tool has been activated, the editing application of other embodiments can allow a user to specify such modifications while providing quick previews. Moreover, even some embodiments that do not allow modifications during quick preview, do allow a user to exit quick preview by selecting all or some of the editing tools. These embodiments do not make the editing tools inaccessible during quick preview.

Specifically, the image editing application of some embodiments provides an automated way of exiting quick preview by detecting that the user wants to perform operations (e.g., edit operations) that would require the actual image to be loaded in the display area. Some of these embodiments not only have the editing application exit quick preview in an automated way, but also have the application enter quick preview in an automated way. For instance, in some embodiments, the application exits quick preview when the user selects an editing tool for editing an image, but automatically re-enter quick preview after the user has finished editing the image (e.g., by selecting a non-editing tool).

Figure 34:
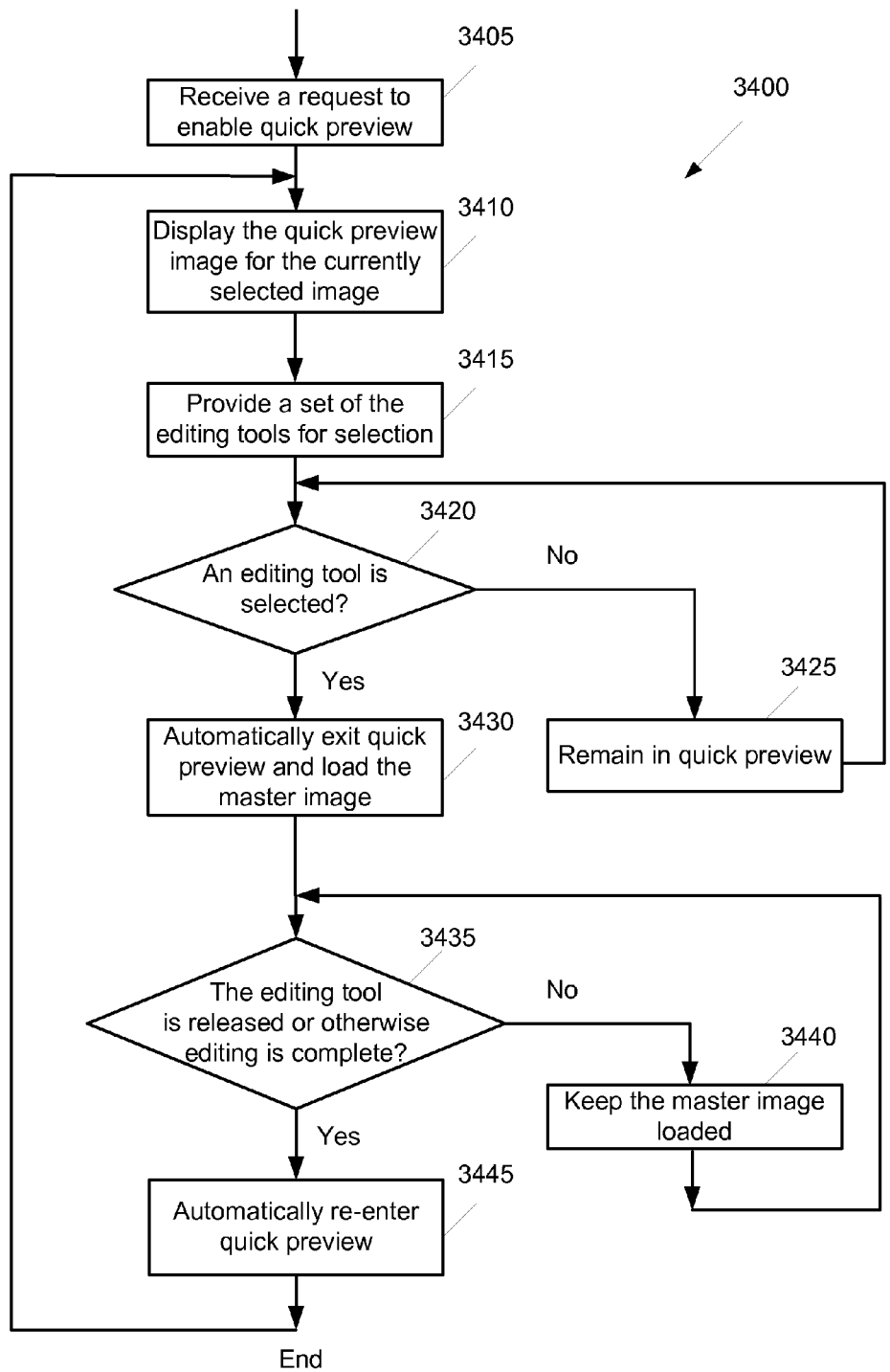
FIG. 34 conceptually illustrates a process that allows editing of an image when the quick preview is activated in some embodiments.

FIG. 34 conceptually illustrates a process that allows editing of an image when the quick preview is activated in some embodiments. As shown, the process receives (at 3405) an indication that quick preview is enabled. Next, the process displays (at 3410) the quick preview image for the currently selected image. The process also provides (at 3415) some or all of the editing tools that are available to edit an image.

At 3420, the process determines whether an editing tool is selected. When no editing tools are selected, the process remains (at 3425) in quick preview. For any subsequent image that is selected the quick preview image is displayed. Any non-editing action (e.g., ranking an image or adding a keyword) leaves the quick preview activated. It should be appreciated that receiving an indication that the quick preview is deactivated (e.g., when a short cut key is hit or an icon is clicked to leave quick preview) causes the quick preview to be disabled. This is not shown in FIG. 34 for simplicity.

When the process determines (at 3420) that an editing tool is selected, the process automatically exits (at 3430) the quick preview and loads the master image for editing. Some embodiments leave the quick preview disabled until an indication (such as clicking an icon or hitting a short cut key) is received to indicate that the quick preview is enabled. These embodiments, exit process 3400 after 3430. Some other embodiments, however, automatically re-enter after the editing is over. In these embodiments, the process determines (at 3435) whether the editing is completed. For instance, the user might select several editing tools (at 3420) and then select a non-editing tool (at 3435). As long as the editing is not completed, the process keeps (at 3440) the master image loaded for editing. On the other hand, when the process determines that the editing is completed, the process automatically re-enters (at 3445) the quick preview by enabling quick preview and displaying the quick preview image. The process then proceeds to 3410 that was described above.

V. Computer System

Figure 35:
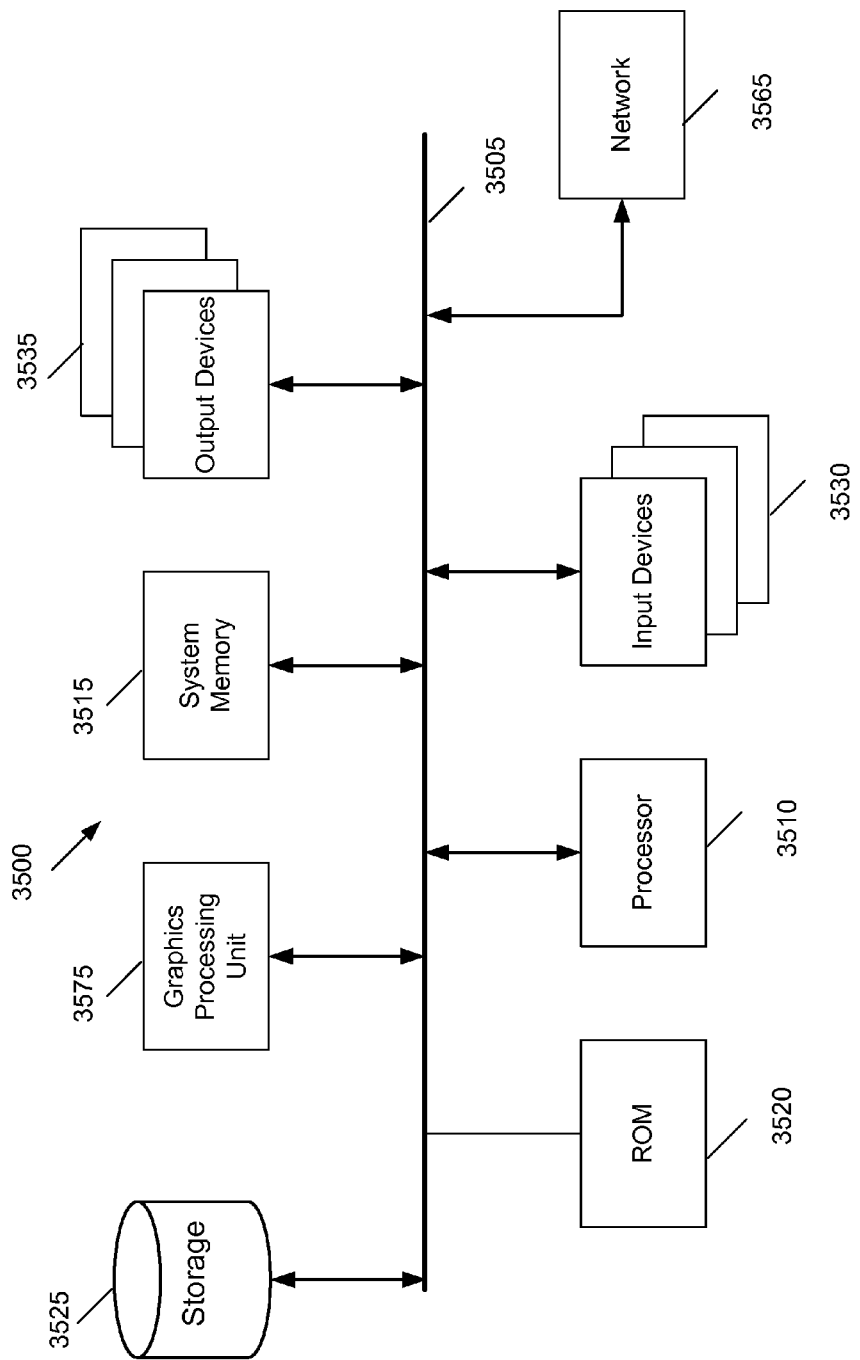
FIG. 35 conceptually illustrates a computer system with which some embodiments of the invention are implemented.

FIG. 35 conceptually illustrates a computer system with which some embodiments of the invention are implemented. The computer system 3500 includes a bus 3505, a processor 3510, a system memory 3515, a read-only memory 3520, a permanent storage device 3525, input devices 3530, and output devices 3535. In some embodiments, the computer system also includes a graphic processing unit (GPU) 3575.

The bus 3505 collectively represents all system, peripheral, and chipset buses that support communication among internal devices of the computer system 3500. For instance, the bus 3505 communicatively connects the processor 3510 with the read-only memory 3520, the system memory 3515, and the permanent storage device 3525.

From these various memory units, the processor 3510 (also referred to as central processing unit or CPU) retrieves instructions to execute and data to process in order to execute the processes of the invention. The read-only-memory (ROM) 3520 stores static data and instructions that are needed by the processor 3510 and other modules of the computer system. The permanent storage device 3525, on the other hand, is a read-and-write memory device. This device is a non-volatile memory unit that stores instruction and data even when the computer system 3500 is off. Some embodiments of the invention use a mass-storage device (such as a magnetic or optical disk and its corresponding disk drive) as the permanent storage device 3525. Other embodiments use a removable storage device (such as a floppy disk or zip® disk, and its corresponding disk drive) as the permanent storage device.

Like the permanent storage device 3525, the system memory 3515 is a read-and-write memory device. However, unlike storage device 3525, the system memory is a volatile read-and-write memory, such as a random access memory. The system memory stores some of the instructions and data that the processor needs at runtime.

Instructions and/or data needed to perform processes of some embodiments are stored in the system memory 3515, the permanent storage device 3525, the read-only memory 3520, or any combination of the three. For example, the various memory units may contain instructions for processing multimedia items in accordance with some embodiments. From these various memory units, the processor 3510 retrieves instructions to execute and data to process in order to execute the processes of some embodiments.

The bus 3505 also connects to the input and output devices 3530 and 3535. The input devices enable the user to communicate information and select commands to the computer system. The input devices 3530 include alphanumeric keyboards, touch panels, and cursor-controllers. The input devices 3530 also include scanners through which an image can be input to the computer system. The output devices 3535 display images generated by the computer system. For instance, these devices display IC design layouts. The output devices include printers, pen plotters, laser printers, ink-jet plotters, film recorders, and display devices, such as cathode ray tubes (CRT), liquid crystal displays (LCD), or electroluminescent displays.

Also, as shown in FIG. 35, bus 3505 also couples computer 3500 to a network 3565 through a network adapter (not shown). In this manner, the computer can be a part of a network of computers (such as a local area network ("LAN"), a wide area network ("WAN"), or an Intranet) or a network of networks (such as the Internet). Finally, as shown in FIG. 35, the computer system in some embodiments also optionally includes a graphics processing unit (GPU) 3575. A GPU (also referred to as a visual processing unit or a display processor) is a dedicated graphics rendering device which is very efficient in manipulating and displaying computer graphics. The GPU can be included in a video card (not shown) or can be integrated into the mother board of the computer system along with the processor 3510. Also, the computer system 3500 may be used as a personal computer, a workstation, a game console, or the like. Some embodiments store computer program instructions (such as instructions for implementing the above mentioned image editing and image management applications) in a machine-readable or computer-readable medium. Examples of machine-readable media or computer-readable media include, but are not limited to magnetic media such as hard disks, memory modules, magnetic tape, optical media such as CD-ROMS and holographic devices, magneto-optical media such as optical disks, and hardware devices that are specially configured to store and execute program code, such as application specific integrated circuits (ASICs), programmable logic devices (PLDs), ROM, and RAM devices. Examples of computer programs or computer code include machine code, such as produced by a compiler, and files including higher-level code that are executed by a computer, an electronic component, or a microprocessor using an interpreter. Any or all of the components of computer system 3500 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. In other places, various changes may be made, and equivalents may be substituted for elements described without departing from the true scope of the present invention.

For instance, instead of JPEG or TIFF formats, an image might be in JPEG2000, PNG, GIF, PSD, HD Photo, or any other formats known in the art. Different sizes of quick preview images might be used. Different visual cues might be used to identify when the quick preview is enabled or disabled. Also, the user interface described in different figures might be changed without deviating from the teachings of the invention. Thus, one of ordinary skill in the art would understand that the invention is not limited by the foregoing illustrative details, but rather is to be defined by the appended claims.

What is claimed is:

1. A method comprising:
    from a source external to a device, importing a first image and a lower resolution second image corresponding to the first image into the device;
    assigning the second image as a preview of the first image;
    when a preview generation option for enabling and disabling generation of preview images from the first image is enabled:
        (i) generating a preview third image for the first image, and
        (ii) assigning the preview third image as the preview of the first image;
    receiving a selection to display the first image in a display area;
    when a preview display option for displaying preview images is disabled, displaying the first image in the display area in response to said selection of the first image for display; and
    when the preview display option for displaying preview images is enabled, displaying the assigned preview image in the display area in response to said selection of the first image for display,
    wherein said preview generation option is different than said preview display option in that the preview display option enables and disables display of a preview image in lieu of displaying a master image and the preview generation option enables and disables generation of a preview image from a master image.

2. The method of claim 1, wherein receiving a selection to display the first image for after generation of the preview third image when the preview display option is enabled, causes a display of the preview third image as a preview of the first image.

3. The method of claim 1, wherein the external source is one of a camera, memory card, hard drive, computer, and image scanner.

4. The method of claim 1, wherein the device is associated with a database, wherein importing the images into the device comprises storing the images in said database.

5. The method of claim 1, wherein the preview third image has a resolution that is larger than the resolution of the second image but is at most equal to a resolution of the first image.

6. The method of claim 1, wherein receiving a selection to display the first image before generating the preview third image when the preview display option is enabled causes a display of the second image as a preview of the first image.

7. The method of claim 1, wherein importing the lower resolution second image comprises:
    when a high resolution thumbnail image corresponding to the first image exists on the external source, importing the high resolution thumbnail image into the device as the lower resolution second image; and
    when a high resolution thumbnail image corresponding to the first image does not exist on the external source, importing a highest resolution thumbnail image corresponding to the first image on the external source into the device as the lower resolution second image.

8. A non-transitory computer readable medium storing a computer program for execution by at least one processing unit, the computer program comprising sets of instructions for:
    importing, from a source external to a device, a first image and a lower resolution second image corresponding to the first image into the device;
    assigning the second image as a preview of the first image;
    when a preview generation option for enabling and disabling generation of preview images from the first image is enabled:
        (i) generating a preview third image for the first image, and
        (ii) assigning the preview third image as the preview of the first image;
    receiving a selection to display the first image in a display area;
    displaying, when a preview display option for displaying preview images is disabled, the first image in the display area in response to said selection of the first image for display; and
    displaying, when the preview display option for displaying preview images is enabled, the assigned preview image in the display area in response to said selection of the first image for display,
    wherein said preview generation option is different than said preview display option in that the preview display option enables and disables display of a preview image in lieu of displaying a master image and the preview generation option enables and disables generation of a preview image from a master image.

9. The non-transitory computer readable medium of claim 8, wherein the computer program further comprises sets of instructions for receiving, when the preview display option is enabled, a selection to display the first image after generating the preview third image; and displaying, in response to said receiving, the preview third image as a preview of the first image.

10. The non-transitory computer readable medium of claim 8, wherein the external source is one of a camera, memory card, hard drive, computer, and image scanner.

11. The non-transitory computer readable medium of claim 8, wherein the device is associated with a database, wherein importing the images into the device comprises storing the images in said database.

12. The non-transitory computer readable medium of claim 8, wherein the preview third image has a resolution that is larger than the resolution of the second image but is at most equal to a resolution of the first image.

13. The non-transitory computer readable medium of claim 8, wherein the computer program further comprises sets of instructions for:

receiving, when the preview display option is enabled, a selection to display the first image after generating the preview third image; and displaying, in response to said receiving, the preview third image as a preview of the first image.

14. The non-transitory computer readable medium 8, wherein the set of instructions for importing the lower resolution second image comprises sets of instructions for:

importing, when a high resolution thumbnail image corresponding to the first image exists on the external source, the high resolution thumbnail image into the device as the lower resolution second image; and importing, when a high resolution thumbnail image corresponding to the first image does not exist on the external source, a highest resolution thumbnail image corresponding to the first image on the external source into the device as the lower resolution second image.

* * * * *